(12) United States Patent
Nishikata et al.

(10) Patent No.: US 10,032,138 B2
(45) Date of Patent: Jul. 24, 2018

(54) PUNCHING APPARATUS CAPABLE OF UPDATING MAINTENANCE INFORMATION AND PUNCHING SYSTEM

(71) Applicant: CANON KABUSHIKI KAISHA, Tokyo (JP)

(72) Inventors: Akinobu Nishikata, Abiko (JP); Yutaka Ando, Toride (JP); Akihiro Arai, Toride (JP); Hiromasa Maenishi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 15/184,151

(22) Filed: Jun. 16, 2016

(65) Prior Publication Data

US 2016/0379177 A1    Dec. 29, 2016

(30) Foreign Application Priority Data

Jun. 24, 2015    (JP) .................. 2015-126702

(51) Int. Cl.
*B26D 1/06* (2006.01)
*G06Q 10/00* (2012.01)
*B26F 1/00* (2006.01)

(52) U.S. Cl.
CPC ........... *G06Q 10/20* (2013.01); *B26F 1/0092* (2013.01)

(58) Field of Classification Search
CPC .................. G06Q 10/20; B26F 1/0092; B65H 2301/51538; B26D 1/06

USPC ............... 270/58.07, 52.17; 399/407; 83/370
See application file for complete search history.

(56) References Cited

U.S. PATENT DOCUMENTS

| | | | |
|---|---|---|---|
| 6,344,018 B1 * | 2/2002 | Aizawa ................. | B21D 28/12 483/10 |
| 7,627,282 B2 | 12/2009 | Oka et al. | |
| 8,180,243 B2 * | 5/2012 | Okamoto ............... | G03G 15/55 358/1.1 |
| 8,413,978 B2 * | 4/2013 | Watanabe ............. | B26F 1/0092 270/58.07 |
| 2007/0163414 A1 * | 7/2007 | Senda .................... | B21D 28/12 83/684 |
| 2014/0224138 A1 * | 8/2014 | Tokumaru ............. | B26F 1/0092 101/26 |
| 2016/0255210 A1 * | 9/2016 | Tachibana ............ | H04N 1/0032 358/1.15 |

* cited by examiner

*Primary Examiner* — Patrick H Mackey
(74) *Attorney, Agent, or Firm* — Rossi, Kimms & McDowell LLP

(57) ABSTRACT

A punching apparatus capable of performing update work for updating maintenance information, irrespective of whether or not a punch die is mounted. A puncher includes a punching unit that punches a sheet using an exchangeable punch die provided with a die memory, and a CPU that detects mounting of a punch die in the punching unit. The CPU receives an update request requesting update of maintenance information stored in the die memory of the punch die. If mounting of the punch die is detected, when the update request designating the punch die is received, the CPU updates the maintenance information of the punch die based on the update request. If mounting of the punch die is not detected, the CPU updates the maintenance information of the punch die when mounting of the punch die is detected.

16 Claims, 24 Drawing Sheets

FIG. 10A

| SHEET ID | XXX |
|---|---|
| SHEET WIDTH [mm] | YYY |
| SHEET LENGTH [mm] | ZZZ |
| BASIS WEIGHT [gsm] | GGG |
| PUNCH SETTING | ON |
| SHEET TYPE | PLAIN PAPER |
| LAST-SHEET FLAG | ON/OFF |
| ⋮ | |

SHEET INFORMATION SENT
FROM IMAGE FORMING
APPARATUS TO PUNCHER
WHEN IN PUNCHING MODE

FIG. 10B

| SHEET ID | XXX |
|---|---|
| SHEET WIDTH [mm] | YYY |
| SHEET LENGTH [mm] | ZZZ |
| BASIS WEIGHT [gsm] | GGG |
| PUNCH SETTING | OFF |
| SHEET TYPE | PLAIN PAPER |
| LAST-SHEET FLAG | ON/OFF |
| ⋮ | |

SHEET INFORMATION SENT
FROM IMAGE FORMING
APPARATUS TO PUNCHER
WHEN NOT IN PUNCHING MODE

FIG. 16A

PUNCH DIE COUNTER

| ◆DIE NO. | ◆ID | ◆TOTAL COUNTER | ◆LUBRICATION COUNTER |
|---|---|---|---|
| AAAAA | ID10 | 1000,000/2000K | 200,000/400K |
| BBBBB | ID11 | 500,000/2000K | 100,000/200K |
| CCCCC | ID20 | 2000,000/5000K | 400,000/400K |
| DDDDD | ID21 | 550,000/5000K | 50,000/500K |
| EEEEE | ID23 | 400,000/5000K | 400,000/500K |

162    163    :    161

[RETURN] [NEXT]     [OK]

FIG. 16B

PUNCH DIE COUNTER

| ◆DIE NO. | ◆ID | ◆TOTAL COUNTER | ◆LUBRICATION COUNTER |
|---|---|---|---|
| AAAAA | ID10 | 1000,000/2000K | 200,000/400K |
| BBBBB | ID11 | 500,000/2000K | 100,000/200K |
| CCCCC | ID20 | 2000,000/5000K | 0/400K |
| DDDDD | ID21 | 550,000/5000K | 50,000/500K |
| EEEEE | ID23 | 400,000/5000K | 400,000/500K |

162    163    :    161

[RETURN] [NEXT]     [OK]

FIG. 16C

PUNCH DIE COUNTER

| ◆DIE NO. | ◆ID | ◆TOTAL COUNTER | ◆LUBRICATION COUNTER |
|---|---|---|---|
| AAAAA | ID10 | 1000,000/2000K | 200,000/400K |
| BBBBB | ID11 | 500,000/2000K | 100,000/200K |
| CCCCC | ID20 | 2100,000/5000K | 100/400K |
| DDDDD | ID21 | 550,000/5000K | 50,000/500K |
| EEEEE | ID23 | 400,000/5000K | 400,000/500K |

162    163    :    161

[RETURN] [NEXT]     [OK]

FIG. 17A

| DIE ID |
| --- |
| DIE NO. |
| TOTAL COUNTER |
| LUBRICATION EXECUTION-TIME COUNTER |

FORMAT OF DIE
INFORMATION STORED
IN DIE MEMORY

FIG. 17B

| ID20 |
| --- |
| CCCCC |
| 2000,000 |
| 1600,000 |

DIE INFORMATION
WHEN LUBRICATED
(DIE MEMORY)

FIG. 17C

| ID20 |
| --- |
| CCCCC |
| 2000,000 |
| 2000,000 |

DIE INFORMATION
WHEN LUBRICATED
(SELF-APPARATUS)

FIG. 17D

| ID20 |
| --- |
| CCCCC |
| 2000,000 |
| 2000,000 |

DIE INFORMATION
AFTER UPDATE
(DIE MEMORY)

FIG. 17E

| ID20 |
| --- |
| CCCCC |
| 2000,000 |
| 2000,000 |

DIE INFORMATION
AFTER UPDATE
(SELF-APPARATUS)

FIG. 17F

| ID20 |
|---|
| CCCCC |
| 2100,000 |
| 1600,000 |

DIE INFORMATION
WHEN USED IN ANOTHER
APPARATUS AFTER
LUBRICATION
(DIE MEMORY)

FIG. 17G

| ID20 |
|---|
| CCCCC |
| 2000,000 |
| 2000,000 |

DIE INFORMATION
WHEN USED IN ANOTHER
APPARATUS AFTER
LUBRICATION
(SELF-APPARATUS)

FIG. 17H

| ID20 |
|---|
| CCCCC |
| 2100,000 |
| 2000,000 |

DIE INFORMATION UPDATED
IN SELF-APPARATUS AFTER
USE IN ANOTHER APPARATUS
(DIE MEMORY)

FIG. 17I

| ID20 |
|---|
| CCCCC |
| 2100,000 |
| 2000,000 |

DIE INFORMATION UPDATED
IN SELF-APPARATUS AFTER
USE IN ANOTHER APPARATUS
(SELF-APPARATUS)

FIG. 20A

FINISH SELECTION — 622

| SORT | GROUP | PUNCH |
| 625 | 626 | 623 |

☐ SHIFT

| CANCEL | OK — 624 |

EXECUTE LUBRICATION OF PUNCH DIE! | EXECUTE IMMEDIATELY — 627

FIG. 20B

PUNCH DIE LUBRICATION INFORMATION — 630

◆DIE NO. ◆ID ◆LUBRICATION COUNTER ◆LUBRICATION EXECUTION (CLEARANCE)

| AAAAA | ID10 | 450,000/400K | CLEARANCE REQUIRED ☐ | — 631 |
| BBBBB | ID11 | 100,000/200K | ☐ |
| CCCCC | ID20 | 400,000/400K | CLEARANCE REQUIRED ☐ |
| DDDDD | ID21 | 50,000/500K | ☐ |
| EEEEE | ID23 | 400,000/500K | ☐ |

| RETURN | NEXT | OK — 632 |
| 634 | 633 |

FIG. 20C

PUNCH DIE LUBRICATION INFORMATION — 630

◆DIE NO. ◆ID ◆LUBRICATION COUNTER ◆LUBRICATION EXECUTION (CLEARANCE)

| | | | |
|---|---|---|---|
| AAAAA | ID10 | 450,000/400K | CLEARANCE REQUIRED ☐ — 631 |
| BBBBB | ID11 | 100,000/200K | ☐ |
| CCCCC | ID20 | 400,000/400K | CLEARANCE REQUIRED ■ |
| DDDDD | ID21 | 50,000/500K | ☐ |
| EEEEE | ID23 | 400,000/500K | ☐ |

⋮

[RETURN] [NEXT]  [OK] — 632
  634    633

FIG. 20D

PUNCH DIE LUBRICATION INFORMATION — 630

◆DIE NO. ◆ID ◆LUBRICATION COUNTER ◆LUBRICATION EXECUTION (CLEARANCE)

| | | | |
|---|---|---|---|
| AAAAA | ID10 | 450,000/400K | CLEARANCE REQUIRED ☐ — 631 |
| BBBBB | ID11 | 100,000/200K | ☐ |
| CCCCC | ID20 | 0/400K | ☐ |
| DDDDD | ID21 | 50,000/500K | ☐ |
| EEEEE | ID23 | 400,000/500K | ☐ |

⋮

[RETURN] [NEXT]  [OK] — 632
  634    633

FIG. 21A

| DIE ID |
| --- |
| DIE NO. |
| TOTAL COUNTER |
| LUBRICATION COUNTER |

FORMAT OF DIE INFORMATION STORED IN DIE MEMORY

FIG. 21B

| DIE ID |
| --- |
| DIE NO. |
| TOTAL COUNTER |
| LUBRICATION COUNTER |
| LUBRICATION COUNTER CLEARANCE INFORMATION |

FORMAT OF DIE INFORMATION STORED IN PUNCHER

FIG. 21C

| ID20 |
| --- |
| CCCCC |
| 2000,000 |
| 400,000 |

AT INITIAL READ-OUT TIME (DIE MEMORY)

FIG. 21D

| ID20 |
| --- |
| CCCCC |
| 2000,000 |
| 400,000 |
| CLEARANCE REQUIRED |

AT INITIAL READ-OUT TIME (PUNCHER)

FIG. 21E

| ID20 |
| --- |
| CCCCC |
| 2000,000 |
| 0 |

AFTER WRITING CLEARANCE INFORMATION (DIE MEMORY)

FIG. 21F

| ID20 |
| --- |
| CCCCC |
| 2000,000 |
| 0 |
| CLEARANCE NOT REQUIRED |

AFTER WRITING CLEARANCE INFORMATION (PUNCHER)

PUNCHING APPARATUS CAPABLE OF UPDATING MAINTENANCE INFORMATION AND PUNCHING SYSTEM

BACKGROUND OF THE INVENTION

Field of the Invention

The present invention relates to a punching apparatus capable of performing punching on sheets by selectively mounting a plurality of punch dies, and a punching system, and more particularly to update of maintenance information of punch dies.

Description of the Related Art

Conventionally, there has been known a punching apparatus that performs punching as post-processing on sheets conveyed from an image forming apparatus (see U.S. Pat. No. 7,627,282). Further, there has also been known a punching apparatus in which a plurality of punch dies different in the shape or number of punched holes can be selectively mounted and used. As for a punching apparatus of this type, it is preferable to perform periodical lubrication as a maintenance operation for maintaining the durability of each punch die, and therefore proper management of lubrication timing is required. For example, conventionally, counters that can be managed on a punch die basis are held in a punching apparatus (puncher) in which each punch die is selectively mounted, and are each used as a guide for determining lubrication timing and die exchange timing.

For the purpose of properly managing lubrication timing, a method is considered in which a nonvolatile memory is mounted on a punch die to store lubrication information indicative of a time at which lubrication was performed last time or the like. However, in order to update the lubrication information stored in the memory, it is required to mount the punch die in a punching apparatus. On the other hand, in general, lubrication work is performed in a state where the punch die is removed from a punching apparatus. Therefore, a user has to perform the following work process.

First, the user mounts the punch die in the punching apparatus and checks the lubrication information. Next, the user removes the punch die from the punching apparatus and performs lubrication work. Then, the user mounts the punch die in the punching apparatus again, and updates the lubrication information. As described above, the user cannot perform update work for updating the lubrication information without mounting the punch die, which makes the update work troublesome and requires a lot of work time.

SUMMARY OF THE INVENTION

The present invention provides a punching apparatus which makes it possible to perform update work for updating maintenance information of a punch die, irrespective of whether or not the punch die is currently mounted, and a punching system.

In a first aspect of the invention, there is provided a punching apparatus comprising a punching unit configured to perform punching on a sheet using a punch die which is exchangeable and is provided with a memory for storing maintenance information which is information concerning maintenance of a punch die, a detection unit configured to detect mounting of a punch die in the punching unit, a reception unit configured to receive an update request requesting update of the maintenance information stored in the memory of a designated punch die, and an update unit configured to, in a case where an update request requesting update of the maintenance information of the designated punch die is received by the reception unit, if mounting of the designated punch die has been detected by the detection unit, update the maintenance information of the designated punch die, based on the update request, and if mounting of the designated punch die has not been detected by the detection unit, update the maintenance information of the designated punch die, when mounting of the designated punch die is detected by the detection unit.

In a second aspect of the invention, there is provided a punching system that performs punching using a punch die which is exchangeable, comprising an image forming section configured to perform image formation on a sheet, a punching unit configured to perform punching on a sheet using a punch die which is exchangeable and provided with a memory for storing maintenance information which is information concerning maintenance of the punch die, a detection unit configured to detect mounting of a punch die in the punching unit, a reception unit configured to receive maintenance execution information indicative of execution of maintenance of a designated punch die, a determination unit configured to determine a content of the maintenance information, which is to be updated, in a case where the maintenance execution information indicative of execution of maintenance of the designated punch is received by the reception unit, and an update unit configured to, in a case where the maintenance execution information is received by the reception unit, if mounting of the designated punch die has been detected by the detection unit, update the maintenance information of the designated punch die stored in the memory, based on the determined content, and if mounting of the designated punch die has not been detected by the detection unit, update the maintenance information of the designated punch die stored in the memory, when mounting of the designated punch die is detected by the detection unit, based on the determined content.

According to the invention, it is possible to perform update work for updating maintenance information of a punch die irrespective of whether or not the punch die is currently mounted.

Further features of the present invention will become apparent from the following description of exemplary embodiments (with reference to the attached drawings).

BRIEF DESCRIPTION OF THE DRAWINGS

FIG. 10A is a view of sheet information notified to the puncher when a punching mode is set.

FIG. 10B is a view of sheet information notified to the puncher when the punching mode is not set.

FIGS. 16A to 16C are views of examples of die information displayed in the form of a list.

FIGS. 17A to 17I are a conceptual view of die information and views illustrating examples of the die information.

FIGS. 20A to 20D are a view of the finish selection screen and views of examples of displays of die information.

FIGS. 21A to 21F are conceptual views of die information and views illustrating examples of the die information.

DESCRIPTION OF THE EMBODIMENTS

The present invention will now be described in detail below with reference to the accompanying drawings showing embodiments thereof.

Figure 1:
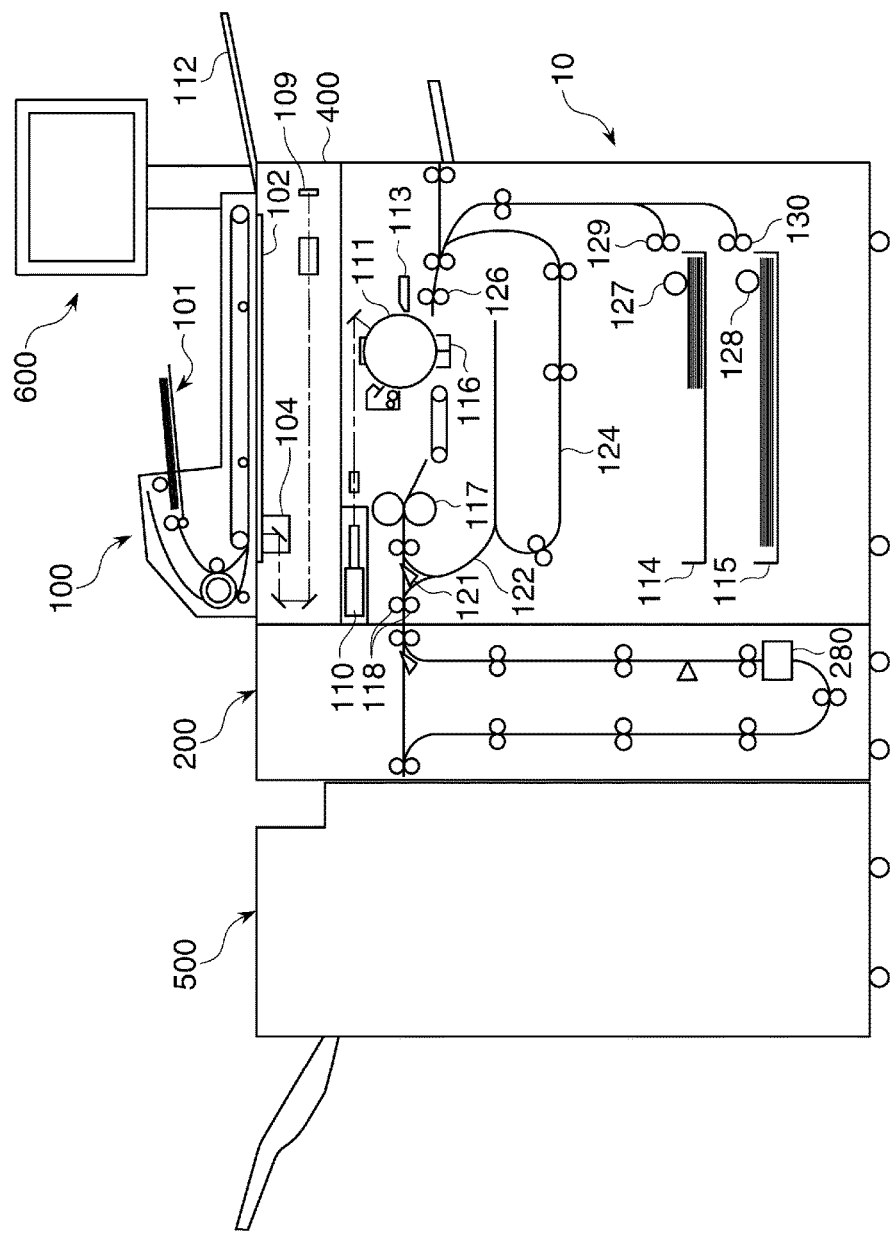
FIG. 1 is a cross-sectional view of an image forming system including a punching apparatus (puncher).

FIG. 1 is a cross-sectional view of an image forming system including a punching apparatus according to a first embodiment of the invention. The image forming system is comprised of an image forming apparatus 10, a console unit 600, an image reader 400, a puncher 200 as a punching apparatus, and a finisher 500. Note that the image forming apparatus 10, the console unit 600, and the image reader 400 may be integrally formed as an image forming apparatus. The puncher 200 is communicably connected to the downstream side of the image forming apparatus 10. The finisher 500 is connected to the downstream side of the puncher 200. Each of the puncher 200 and the finisher 500 is a post-processing apparatus that performs post-processing.

A document feeder 100 sequentially feeds originals each set with a front surface facing upward on an original tray 101, one by one, from the leading page in the leftward direction, as viewed in FIG. 1. The originals are each conveyed, via a curved path, through a predetermined reading position on a platen glass 102, from left to right. Then, the document feeder 100 discharges each original onto a discharge tray 112 disposed outside.

An image reader 400 reads an image on the original conveyed by the document feeder 100, using an image sensor 109. The image optically read from the original is input as a video signal to an exposure section 110 of the image forming apparatus 10.

The exposure section 110 of the image forming apparatus 10 irradiates a photosensitive drum 111 with a laser beam based on the video signal input from the image reader 400. An electrostatic latent image is formed on the photosensitive drum 111 according to the irradiated laser beam. The electrostatic latent image on the photosensitive drum 111 is developed and visualized as a developer image by a developer supplied from a developing device 113.

On the other hand, a sheet fed by a pickup roller 127 or 128 from an upper cassette 114 or a lower cassette 115 provided in the image forming apparatus 10 is conveyed to a registration roller pair 126 by a sheet feed roller pair 129 or 130.

The developer image formed on the photosensitive drum 111 is transferred by a transfer section 116 onto the sheet conveyed via the registration roller pair 126. The sheet onto which the developer image has been transferred is conveyed to a fixing section 117. The fixing section 117 fixes the developer image on the sheet by heating and pressing the sheet.

To discharge a sheet with its image-formed surface down (face down), the image forming apparatus 10 temporally guides the sheet having passed the fixing section 117 into an inversion path 122 by a switching operation of a flapper 121. Then, after a trailing end of the sheet passes the flapper 121, the image forming apparatus 10 causes the sheet to be switched back and discharged out of the image forming apparatus 10 by a discharge roller pair 118.

Further, in a case where double-sided printing for forming an image on each side of a sheet is set, the image forming apparatus 10 guides the sheet into the inversion path 122 by the switching operation of the flapper 121, and then conveys the same to a double-sided conveying path 124. Then, the sheet guided into the double-sided conveying path 124 is controlled to be fed again between the photosensitive drum 111 and the transfer section 116.

Figure 2:
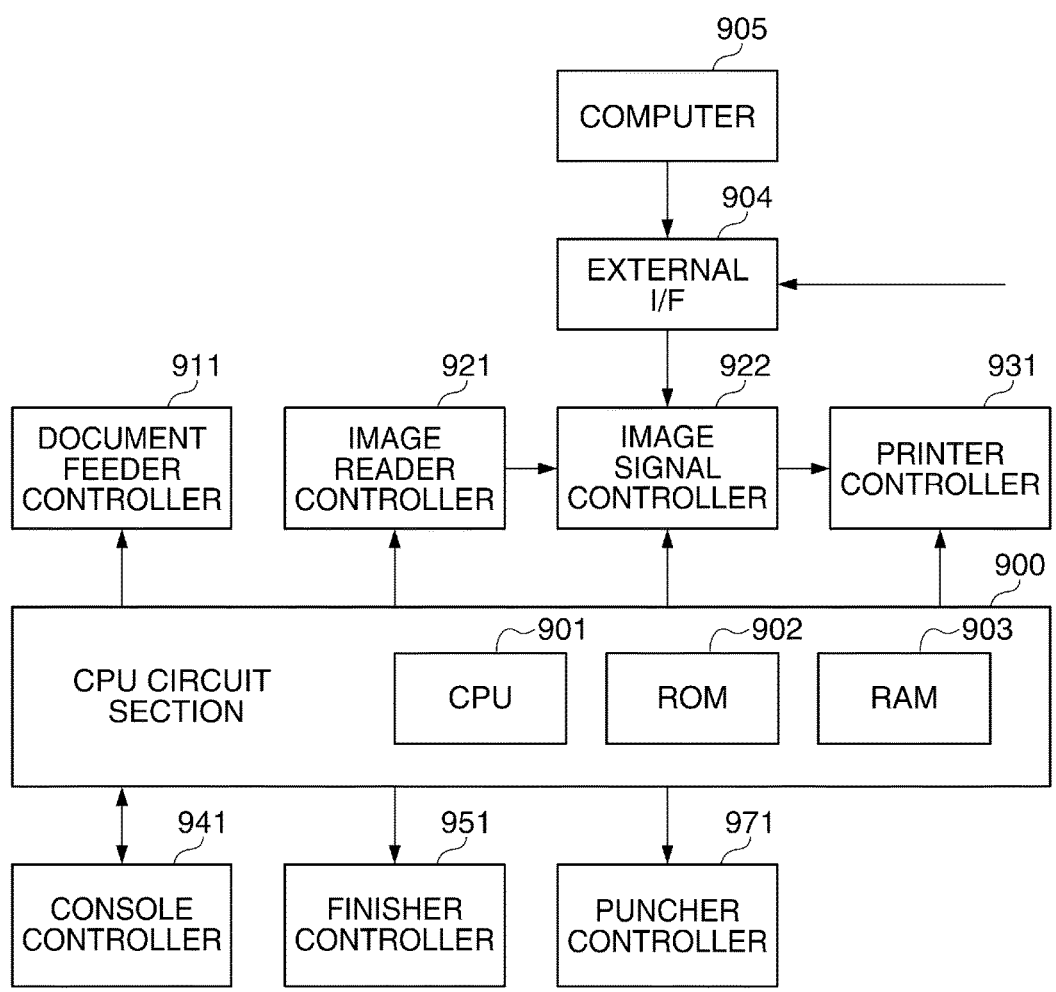
FIG. 2 is a block diagram of a control system of the whole image forming system.

FIG. 2 is a block diagram of a control system of the whole image forming system. The image forming apparatus 10 is provided with a CPU circuit section 900 that controls the overall operation of the image forming system. The CPU circuit section 900 includes a CPU 901, a ROM 902, and a RAM 903. The CPU 901 performs basic control of the whole image forming system. The CPU 901 is connected by an address bus and a data bus to the ROM 902 storing control programs and the RAM 903 for use in processing performed by the CPU 901. The CPU 901 performs centralized control of controllers 911, 921, 922, 931, 941, 951, and 971 according to the control programs stored in the ROM 902. The RAM 903 temporally holds control data, and is used as a work area for arithmetic operations involved in control processing.

A document feeder controller 911 controls driving of the document feeder 100 based on instructions from the CPU circuit section 900. An image reader controller 921 controls driving of a scanner unit 104, the image sensor 109, and so forth, and transfers an image signal output from the image sensor 109 to the image signal controller 922. An image signal controller 922 converts the image signal, which is an analog signal, from the image sensor 109 to a digital signal, and then converts the digital signal to a video signal by performing various processing on the digital signal, to output the video signal to a printer controller 931. Further, the image signal controller 922 performs various processing on a digital image signal input from a computer 905 via an external interface 904, and converts the digital image signal to a video signal, to output the video signal to the printer controller 931. The processing operations by the image signal controller 922 are controlled by the CPU circuit section 900. The printer controller 931 controls the exposure section 110 and the image forming apparatus 10 based on the input video signal to thereby perform image formation and sheet conveyance.

A puncher controller 971 is mounted in the puncher 200 and controls driving of the whole puncher 200 by exchanging information with the CPU circuit section 900. The details of this control operation will be described hereinafter. A finisher controller 951 is mounted in the finisher 500, and controls driving of the whole finisher 500 by exchanging information with the CPU circuit section 900.

A console controller 941 exchanges information with the console unit 600 and the CPU circuit section 900. The console unit 600 has a plurality of keys for configuring various functions concerning image formation, a display section that displays information indicating a setting state of a function, and so forth. The console controller 941 outputs a key signal corresponding to an operation of each key to the CPU circuit section 900. Further, based on a signal from the CPU circuit section 900, the console controller 941 causes the console unit 600 to display corresponding information.

Figure 3:
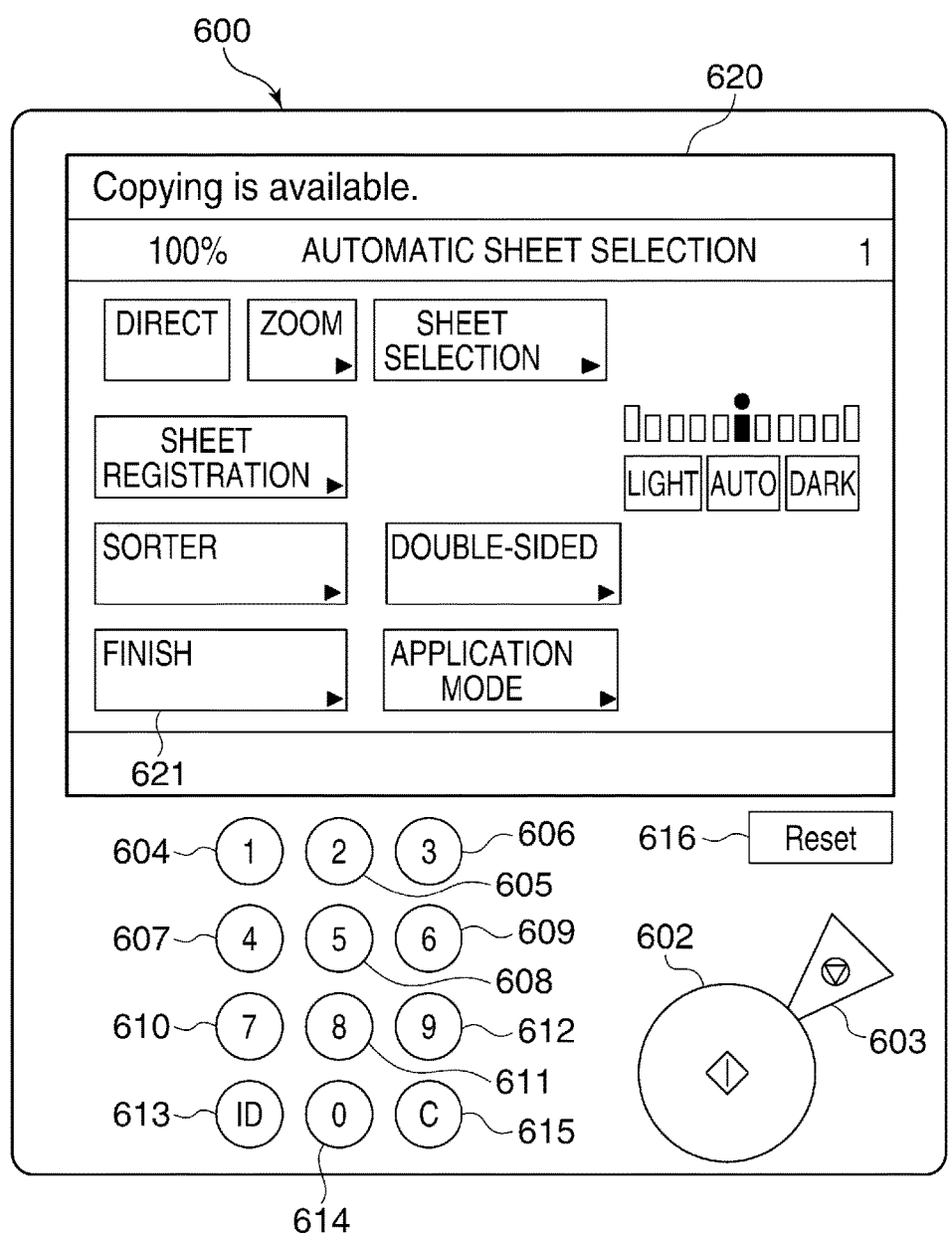
FIG. 3 is a view of a console unit.

FIG. 3 is a view of the console unit 600. The console unit 600 is provided with a start key 602 for starting an image forming operation, a stop key 603 for stopping the image forming operation, and ten keys 604 to 612 and 614 for entering numbers. Further, on the console unit 600, there are arranged an ID key 613, a clear key 615, and a reset key 616. Further, in an upper part of the console unit 600, there is disposed a display section 620 having a touch panel function, and soft keys including a finish key 621 can be displayed on a display screen of the display section 620.

The image forming apparatus 10 has post-processing modes, such as a non-sorting mode, a sorting mode, a stapling sorting mode (binding mode), and a punching mode. The processing modes are each set according to a user input operation on the console unit 600.

Figure 4:
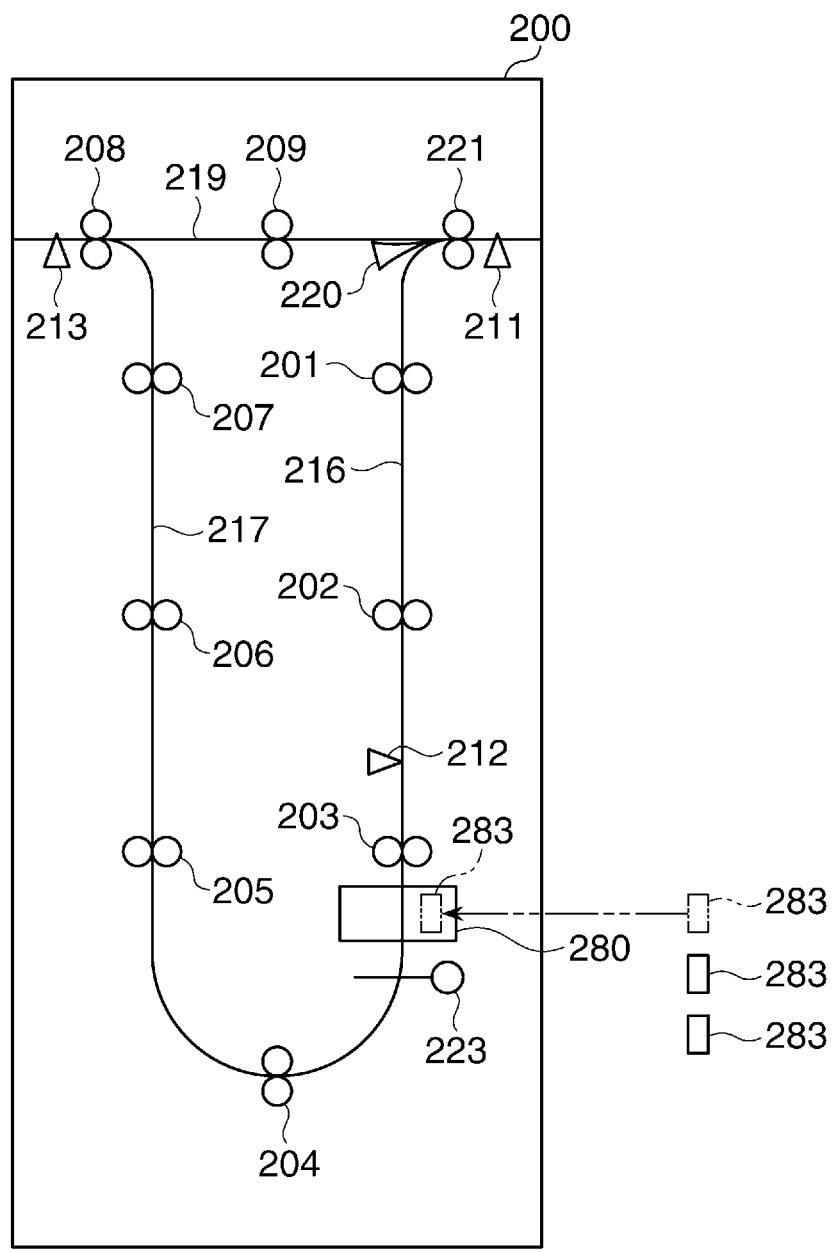
FIG. 4 is a schematic cross-sectional view of the puncher.

FIG. 4 is a schematic cross-sectional view of the puncher 200. The puncher 200 sequentially takes in each sheet discharged from the image forming apparatus 10 and performs punching on the taken-in sheet, as required, under the control of the puncher controller 971. Whether or not to perform punching (i.e. whether or not the punching mode has been set) is determined based on sheet information sent from the image forming apparatus 10.

Figure 5:
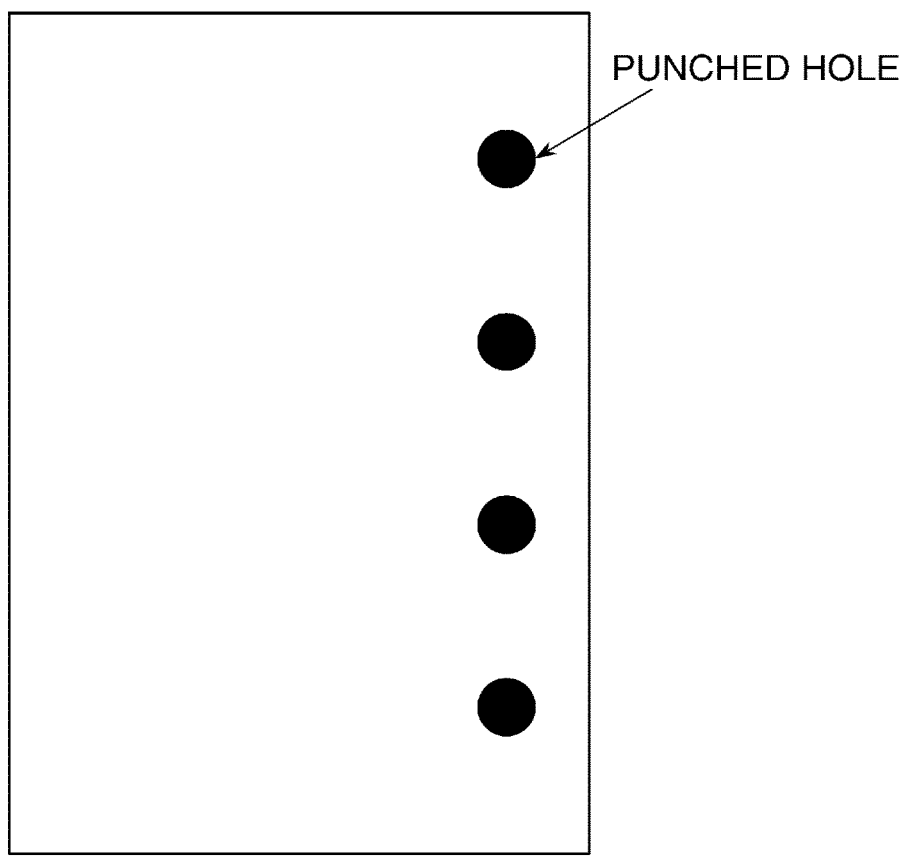
FIG. 5 is a view of an example of a sheet having a plurality of holes punched therein.

When a through-conveying mode in which punching is not performed has been set, a taken-in sheet is guided into a through path 219 by a conveying roller pair 221 and a flapper 220, and is conveyed to the finisher 500 via conveying roller pairs 209 and 208. On the other hand, when the punching mode in which punching is performed has been set, a sheet is taken into a punching path 216 by the conveying roller pair 221 and the flapper 220. The sheet is conveyed along the punching path 216 by conveying roller pairs 201, 202, and 203, and punching is performed by a punching unit 280 with the sheet held in abutment with an abutment member 223. The punching unit 280 corresponds to a punching unit in the invention. FIG. 5 shows an example of a sheet having a plurality of holes formed by punching. Note that although in the present embodiment, the abutment member 223 is provided as a member for stopping a sheet, by way of example, a sheet may be stopped by a nip formed by a roller pair, instead of the abutment member 223.

The punched sheet is discharged out of the puncher 200 via a discharge path 217 by conveying roller pairs 204, 205, 206, and 207, and the conveying roller pairs 208, and is delivered to the finisher 500. On the punching path 216, there is provided a conveyance sensor 212, and on the through path 219, there are provided conveyance sensors 211 and 213. Each of the conveyance sensors 211, 212, and 213 detects passage of a sheet.

Incidentally, in the punching unit 280, there is mounted (set) a punch die 283 that is removable for exchange. One of a plurality of punch dies 283 is selectively mounted in the punching unit 280 by a user, for punching. The punch dies 283 are different from each other in type, for example, in the shape and number of holes to be punched. By exchanging the punch die 283 with a punch die 283 of another type, it is possible to punch holes different from those shown in FIG. 5. Note that two or more punch dies 283 of the same type may be made ready for use, but serial numbers serving as identification formation for individually identifying the punch dies 283 are attached thereto, respectively, each as information unique to an associated one of the punch dies 283.

Next, a description will be given, with reference to FIG. 6, of the configuration of the puncher controller 971 that controls the driving of the puncher 200.

Figure 6:
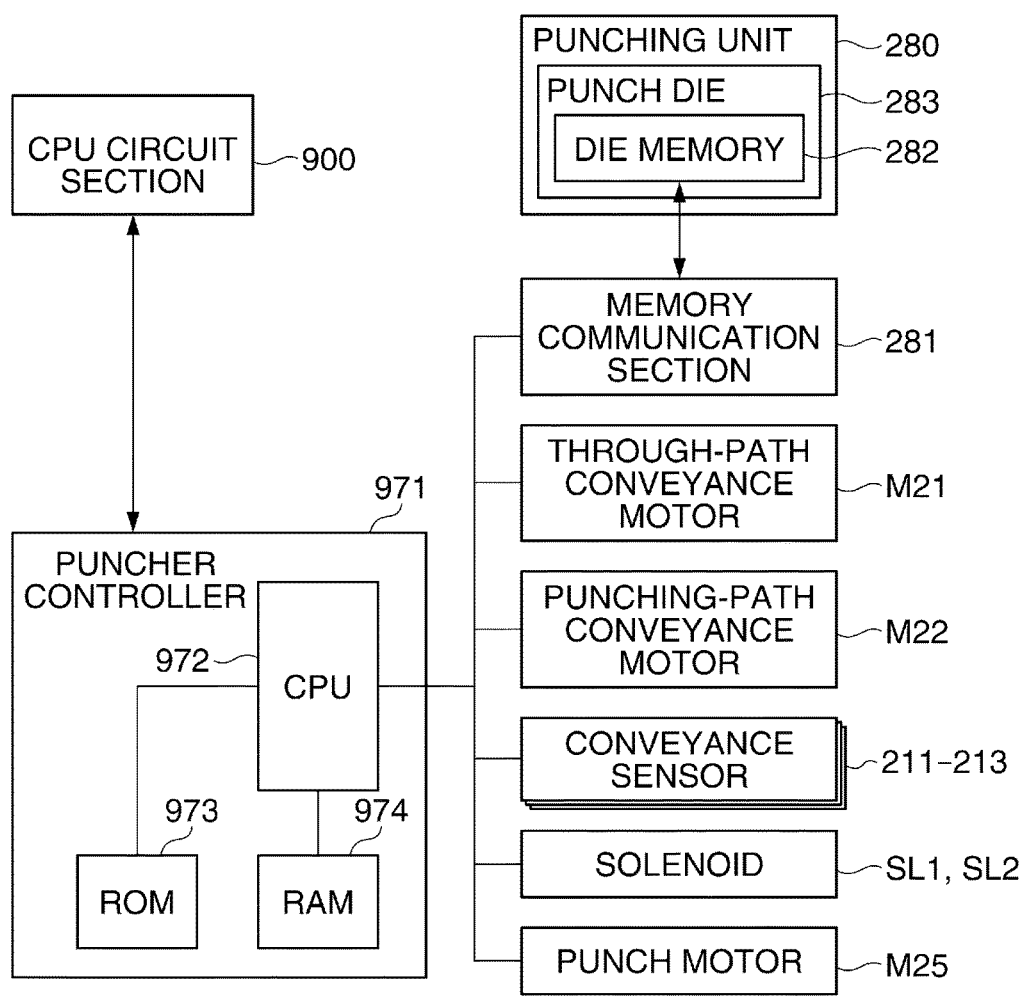
FIG. 6 is a functional block diagram of the puncher.

FIG. 6 is a functional block diagram of the puncher 200. The puncher controller 971 of the puncher 200 communicates with the CPU circuit section 900 of the image forming apparatus 10 via a communication IC, not shown. The puncher controller 971 includes a CPU 972, a ROM 973, and a RAM 974. The puncher controller 971 communicates with the CPU circuit section 900 to exchange data including a job information notification and a sheet receipt and delivery notification. Then, the puncher controller 971 executes various programs stored in the ROM 973 according to instructions from the CPU circuit section 900, to thereby control the driving of the puncher 200.

Each of the punch dies 283 is provided with a die memory 282. The die memory 282 is a rewritable nonvolatile memory, for example. The CPU 972 communicates with the die memory 282 of a punch die 283 set in the punch unit 280, via a memory communication section 281. When die information stored in the die memory 282 is read and written properly, the CPU 972 recognizes that the punch die 283 has been set.

A description will be given of various input and output devices provided in the puncher 200. The puncher 200 has a through-path conveyance motor M21, a punching-path conveyance motor M22, a solenoid SL1, a solenoid SL2, the conveyance sensors 211 to 213, and a punch motor M25, each provided as a component related to sheet conveyance. The through-path conveyance motor M21 drives the conveying roller pairs 208, 209, and 221. The punching-path conveyance motor M22 drives the conveying roller pairs 201 to 207. The solenoid SL1 drives the flapper 220 for switching a conveyance destination of a sheet between the through path 219 and the punching path 216. The solenoid SL2 drives the abutment member 223. The punching unit 280 has a blade, not shown, and the blade cooperates with a mounted punch die 283 to punch holes in a sheet conveyed thereto. The punch motor M25 drives the blade of the punching unit 280 for the punching operation.

Figure 7:
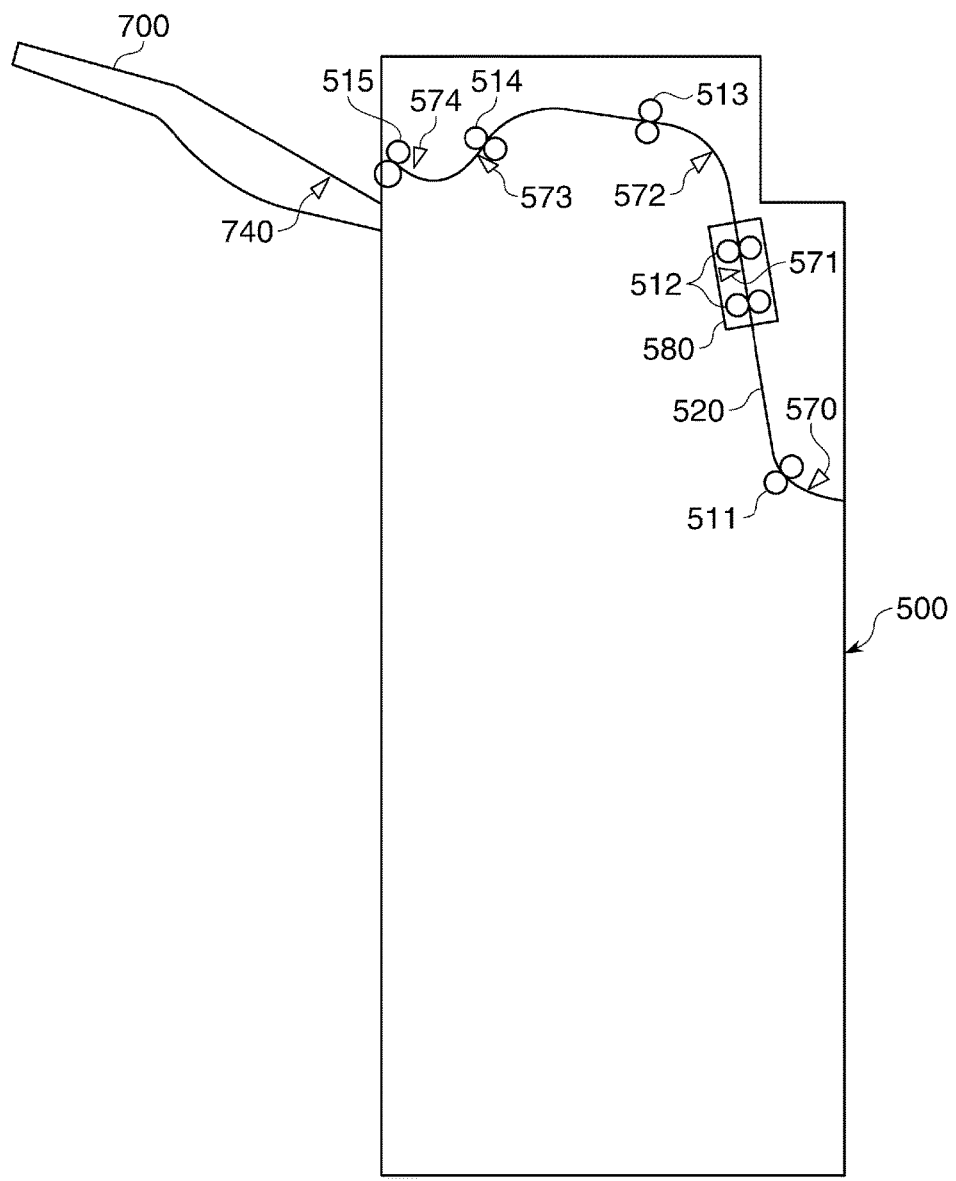
FIG. 7 is a schematic cross-sectional view of a finisher.

FIG. 7 is a schematic cross-sectional view of the finisher 500. The finisher 500 takes a sheet discharged from the puncher 200 into a conveying path 520 by a conveying roller pair 511 under the control of the finisher controller 951. The sheet taken in by the conveying roller pair 511 is conveyed by conveying roller pairs 512, 513, and 514. In the conveying path 520, there are arranged conveyance sensors 570, 571, 572, 573, and 574, each for detecting passage of the sheet conveyed to a position thereof.

The conveying roller pairs 512 are provided in a shift unit 580 together with the conveyance sensor 571. The shift unit 580 can be moved in a lateral direction orthogonal to a sheet conveying direction by being driven by a shift motor M4 (see FIG. 8). When a sheet is conveyed to the shift unit 580, the finisher 500 detects the amount of displacement of the sheet with respect to a reference position in the lateral direction by a lateral position sensor 577 (see FIG. 8). In a case where there is a shift designation, the finisher 500 conveys the sheet downstream while moving the shift unit 580 in the lateral direction by a shift amount in which the amount of displacement of the sheet is taken into account. In a case where there is no shift designation, the finisher 500 conveys the sheet downstream while moving the shift unit 580 in the lateral direction by the amount of displacement of the sheet. Upon detecting passage of the sheet through the shift unit 580 by an input from the conveyance sensor 571, the finisher 500 drives the shift motor M4 to return the shift unit 580 to its initial position. The sheet having passed through the shift unit 580 is discharged onto a stacking tray 700 via the conveying roller pairs 513 and 514, and a conveying roller pair 515. The stacking tray 700 is provided with a tray sheet presence/absence sensor 740.

Figure 8:
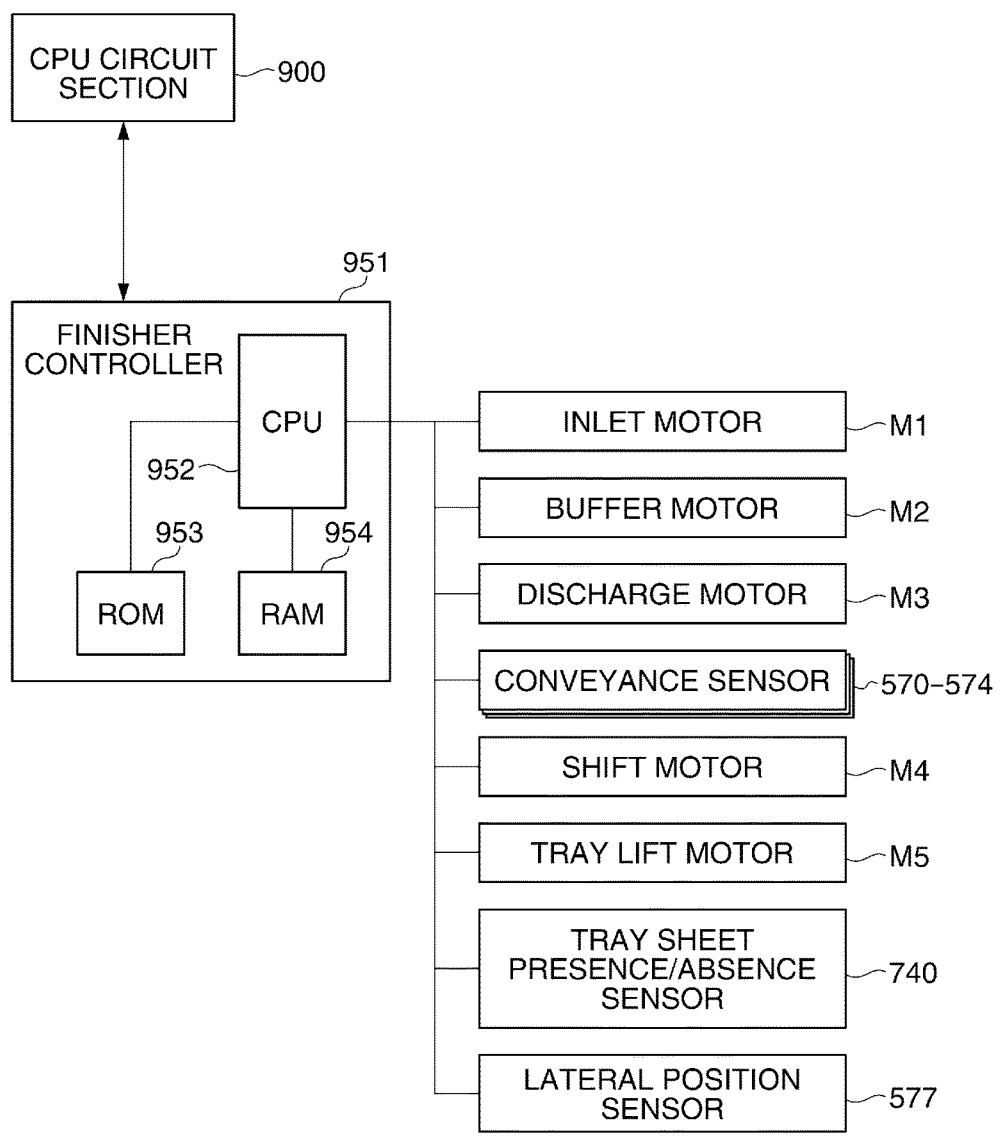
FIG. 8 is a functional block diagram of the finisher.

FIG. 8 is a functional block diagram of the finisher 500. The finisher controller 951 includes a CPU 952, a ROM 953, and a RAM 954. The finisher controller 951 communicates with the CPU circuit section 900 via the communication IC, not shown, to exchange data including a job information notification and a sheet receipt and delivery notification. The finisher controller 951 executes various programs stored in the ROM 953 according to instructions from the CPU circuit section 900, to thereby control the driving of the finisher 500.

A description will be given of various input and output devices provided in the finisher 500. The finisher 500 is provided with an inlet motor M1, a buffer motor M2, a discharge motor M3, the conveyance sensors 570 to 574, the shift motor M4, a tray lift motor M5, the tray sheet presence/absence sensor 740, and the lateral position sensor 577. The inlet motor M1 drives the conveying roller pair 511. The buffer motor M2 drives the conveying roller pairs 512, 513, and 514. The discharge motor M3 drives the conveying roller pair 515. The shift motor M4 drives the shift unit 580. The tray lift motor M5 lifts up and down the stacking tray 700.

Next, a description will be given, with reference to FIGS. 3, 9, 10A, and 10B, of a procedure for setting a punch job via the console unit 600. The punch job is a job for which the punching mode is set.

Figure 9:
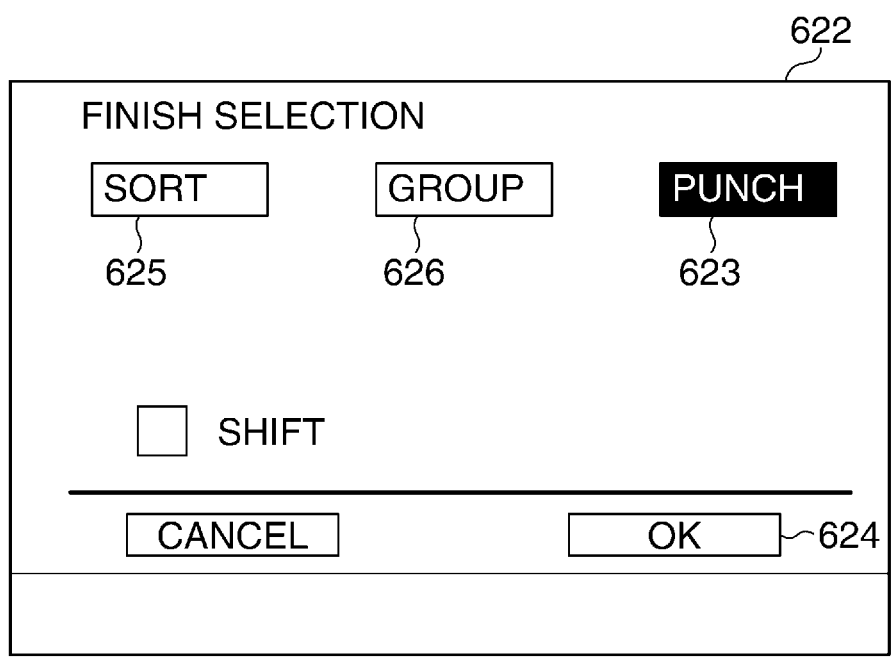
FIG. 9 is a view of an example of a finish selection screen displayed on a display section of the console unit.

FIG. 9 shows an example of a finish selection screen 622 which is displayed on the display section 620 of the console unit 600. In a standby state of the console unit 600, to set a punch job, the user presses the finish key 621 in the initial screen on the display section 620, shown in FIG. 3. When it is determined, based on information output from the console controller 941, that the finish key 621 has been pressed, the CPU 901 shifts the screen currently displayed on the display section 620 to the finish selection screen 622 shown in FIG. 9. When a punch key 623 is pressed and then an OK key 624 is pressed in the finish selection screen 622, the punching mode is set for a job, and the finish selection screen 622 is shifted to the initial screen. When a key other than the punch key 623 (i.e. a sort key 625 or a group key 626) is pressed and then the OK key 624 is pressed, a mode corresponding to the selected key is set for a job. Then, when the job is started, sheet information (see FIG. 10A or 10B) is sent to the puncher 200.

FIGS. 10A and 10B are conceptual views of sheet information. FIG. 10A shows sheet information received from the image forming apparatus 10 when the punching mode has been set, and FIG. 10B shows sheet information received from the image forming apparatus 10 when the punching mode has not been set. In the sheet information (FIG. 10A) received when the punching mode has been set, "punch setting" has been set to "ON".

Next, a description will be given, with reference to FIGS. 4, and 11 to 13A and 13B, of operations of the CPU 972 for execution of sheet conveyance in the puncher 200. Note that sheet information is included in job information. Sheet information is set on a sheet-by-sheet basis.

Figure 11:
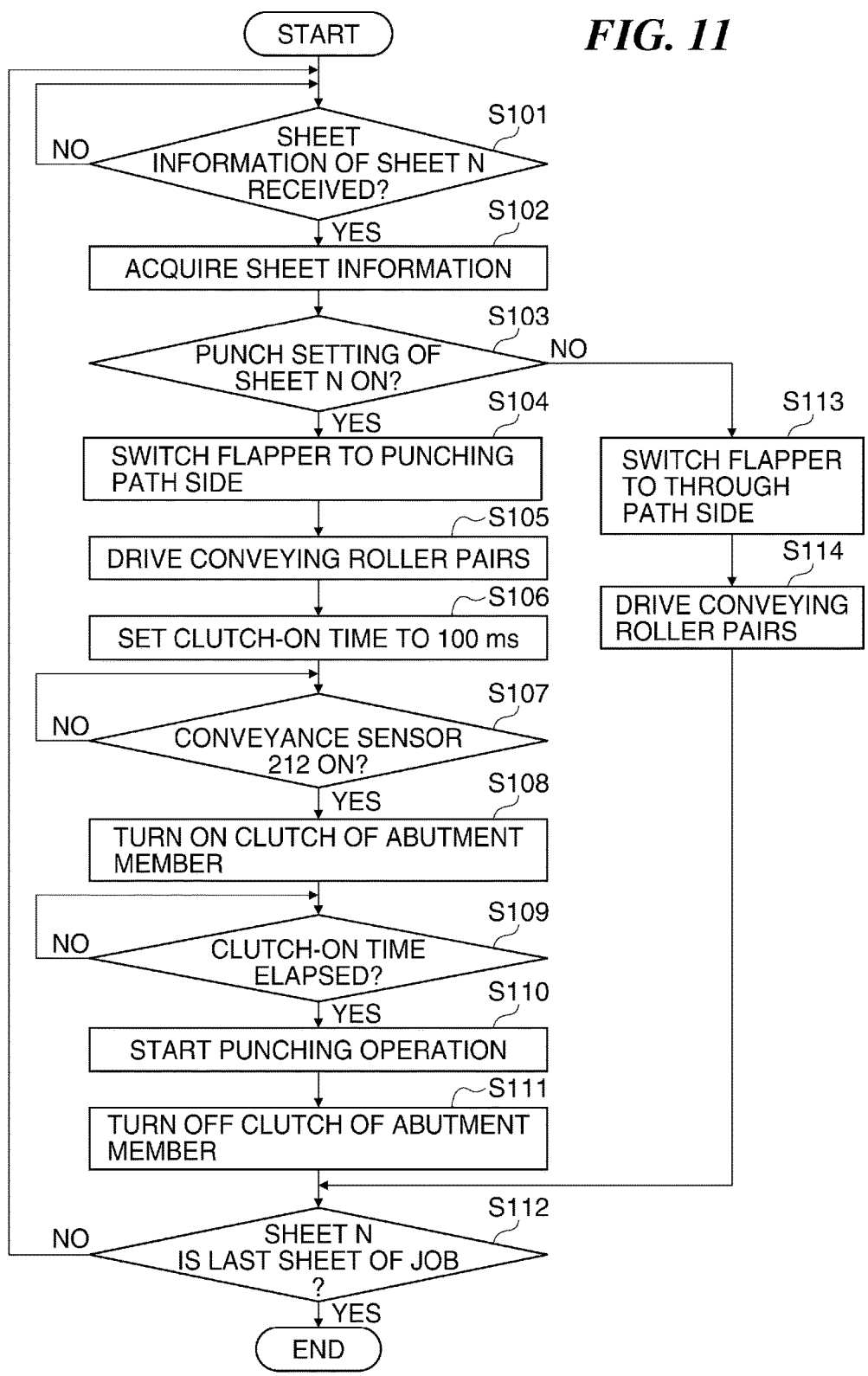
FIG. 11 is a flowchart of a sheet conveyance control process in the puncher.
Figure 12A:
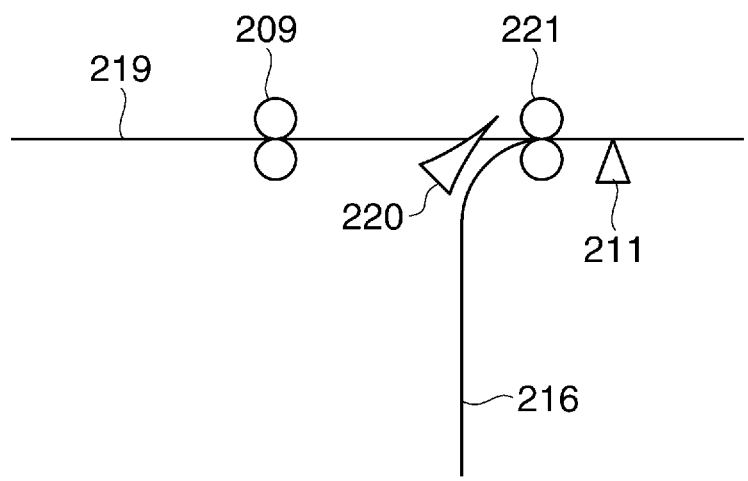
FIGS. 12A and 12B are enlarged views of a flapper and a neighborhood of the flapper.
Figure 12B:
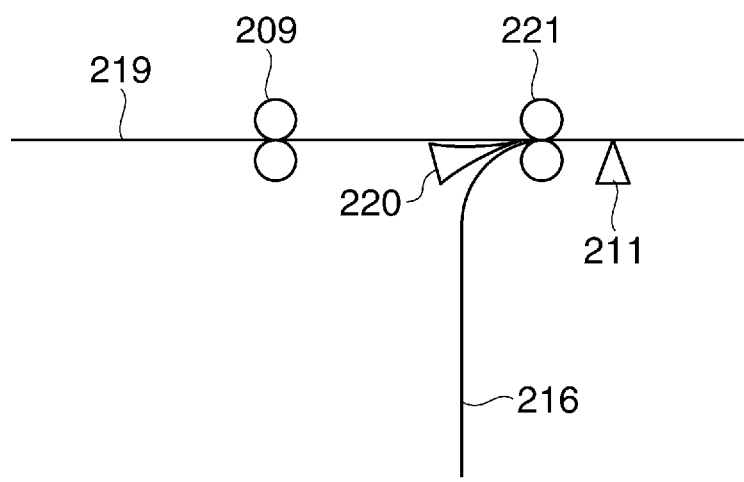
Figure 13A:
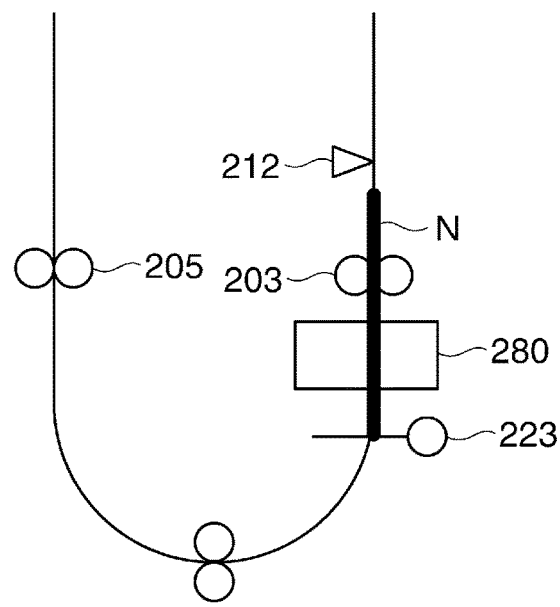
FIGS. 13A and 13B are enlarged views of a punching unit and a neighborhood of the punching unit.
Figure 13B:
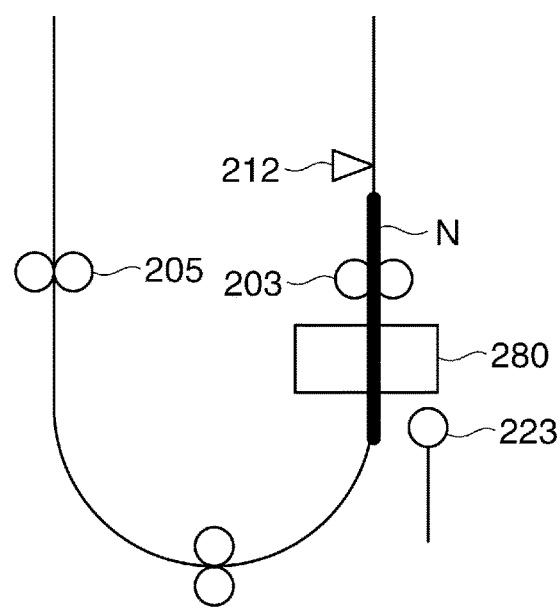

FIG. 11 is a flowchart of a sheet conveyance control process performed by the puncher 200. This process is started when a job is input. A sheet to be processed this time in the present process will be referred to as "the sheet N". FIGS. 12A and 12B are enlarged views of the flapper 220 and its neighborhood. FIGS. 13A and 13B are enlarged view of the punching unit 280 and its neighborhood.

First, the CPU 972 awaits receipt of sheet information on the sheet N from the image forming apparatus 10 (step S101). When the sheet information on the sheet N is received, the CPU 972 acquires the sheet information and stores the same in the RAM 974, and the sheet information is sent to the finisher 500 at the same time (step S102). Then, the CPU 972 determines an operation of the flapper 220, based on whether the punch setting has been set to "ON" or "OFF", so as to guide the sheet N into a conveying path corresponding to the sheet information (step S103).

If it is determined in the step S103 that the punch setting has been set to "OFF", which means that the through-conveying mode has been set, the CPU 972 turns off the solenoid SL1 to thereby switch the flapper 220, as shown in FIG. 12B, such that the sheet N is guided into the through path 219 (step S113). Then, the CPU 972 drives the through-path conveyance motor M21 to cause rotation of the conveying roller pairs 208, 209, and 221 so as to convey the sheet N along the through path 219 (step S114). Thereafter, the CPU 972 proceeds to a step S112.

On the other hand, if it is determined in the step S103 that the punch setting has been set to "ON", which means that the punching mode has been set, the CPU 972 turns on the solenoid SL1 to thereby switch the flapper 220, as shown in FIG. 12A, such that the sheet N is guided into the punching path 216 (step S104). Then, the CPU 972 drives the through-path conveyance motor M21 and the punching-path conveyance motor M22 to cause rotation of the conveying roller pairs 201 to 209 and 221 so as to convey the sheet N along the punching path 216 (step S105).

Then, the CPU 972 sets a clutch-on time T to a predetermined time period (step S106). The clutch-on time T is a time period which is to elapse from a time point when the conveyance sensor 212 is turned on to a time point when a punching operation is started, and defines a stop time period over which a sheet N is held stopped by the abutment member 223. The clutch-on time T is set to a value that makes it possible to secure a sufficient stop time period required for proper punching, e.g. 100 msec.

Then, the CPU 972 waits until the conveyance sensor 212 is turned on (step S107). When the conveyance sensor 212 is turned on, the CPU 972 turns on a clutch, not shown, of the abutment member 223 by driving the solenoid SL2, to thereby stop the sheet N (step S108). During a time period over which the clutch is held on, the state is maintained in which the sheet N is held stopped by the abutment member 223 in abutment therewith, as shown in FIG. 13A.

Then, the CPU 972 waits until the clutch-on time T elapses after the conveyance sensor 212 is turned on (step S109), and drives the punch motor M25 after the lapse of the clutch-on time T to cause the punching unit 280 to start a punching operation (step S110). After completion of the punching operation, the CPU 972 stops driving the solenoid SL2 to thereby turn off the clutch of the abutment member 223 (step S111). During a time period over which the clutch is held off, the abutment member 223 is held retracted from the punching path 216, as shown in FIG. 13B, and hence the stoppage of the sheet N is released. Accordingly, the sheet N is conveyed to the finisher 500 provided downstream.

Then, in the step S112, the CPU 972 determines whether or not the sheet N processed this time is a last sheet in the present job, by referring to a last-sheet flag included in the sheet information on the sheet N. If it is determined that the sheet N is not the last sheet, the CPU 972 returns to the step S101, whereas if it is determined that the sheet N is the last sheet, the CPU 972 terminates the sheet conveyance control process shown in FIG. 11.

Figure 14:
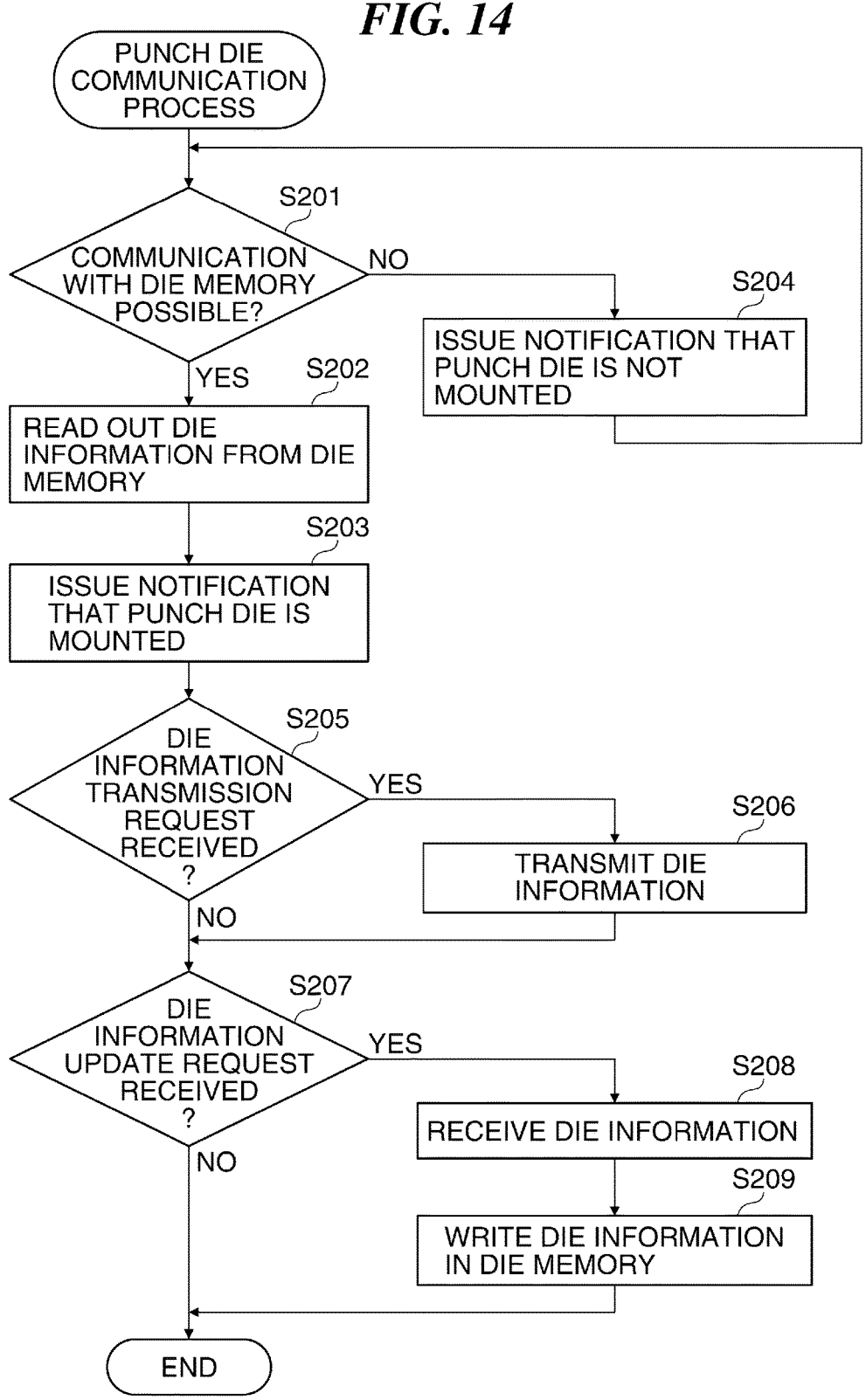
FIG. 14 is a flowchart of a punch die communication process.

FIG. 14 is a flowchart of a punch die communication process. The punch die communication process is performed by the CPU 972 of the puncher 200 through communication with a punch die 283. The punch die communication process is started when the puncher 200 is powered on or when a punch die 283 is mounted in the punch unit 280 after the puncher 200 is powered on, and is repeatedly performed at predetermined time intervals.

First, the CPU 972 determines whether or not communication with the die memory 282 provided in a punch die 283 is possible (step S201). If it is determined that the communication with the die memory 282 is impossible, the CPU 972 determines that there is no punch die 283 currently mounted, and notifies the CPU circuit section 900 of absence of the punch die 283 (step S204), thereafter returning to the step S201. On the other hand, if the communication with the die memory 282 is possible, the CPU 972 determines that the punch die 283 is currently mounted, and reads out die information stored in the die memory 282 thereof (step S202). The die information (see FIG. 17A) stored in the die memory 282 will be described hereinafter.

Note that from the viewpoint of determining mounting of a punch die 283, a sensor for detecting the mounting of a punch die 283 may be provided in the puncher 200. In this case, the CPU 972 determines whether or not a punch die 283 is currently mounted, not based on whether or not communication with a die memory 282 is possible, but based on a result of detection by the sensor. In the step S201, the CPU 972 serves as a detection unit in the invention.

Then, the CPU 972 notifies the CPU circuit section 900 that the punch die 283 is currently mounted (step S203). Thereafter, the CPU 972 determines whether or not a die information transmission request has been received from the CPU circuit section 900 (step S205). If it is determined that the die information transmission request has not been received, the CPU 972 proceeds to a step S207. On the other hand, if it is determined that the die information transmission request has been received, the CPU 972 sends the die information read out in the step S202 to the CPU circuit section 900 (step S206), and then proceeds to the step S207.

In the step S207, the CPU 972 determines whether or not a die information update request has been received from the CPU circuit section 900 (step S207). The die information update request is an "update request" that requests the update of the die information stored in the die memory 282 of a designated punch die. If it is determined that the die information update request has been received, the CPU 972 receives die information for update, from the CPU circuit section 900 (step S208). The die information for update is die information received in a step S306 in FIG. 15, referred to hereinafter, or in a step S405 in FIG. 18, referred to hereinafter. In the present step, the CPU 972 serves as a reception unit in the invention. Then, the CPU 972 writes the received die information in the die memory 282 to thereby update the die information (step 209). In the present step, the CPU 972 serves as an update unit in the invention. Thereafter, the CPU 972 terminates the FIG. 14 punch die communication process. On the other hand, if the die information update request has not been received, the CPU 972 terminates the FIG. 14 punch die communication process without receiving the die information.

Figure 15:
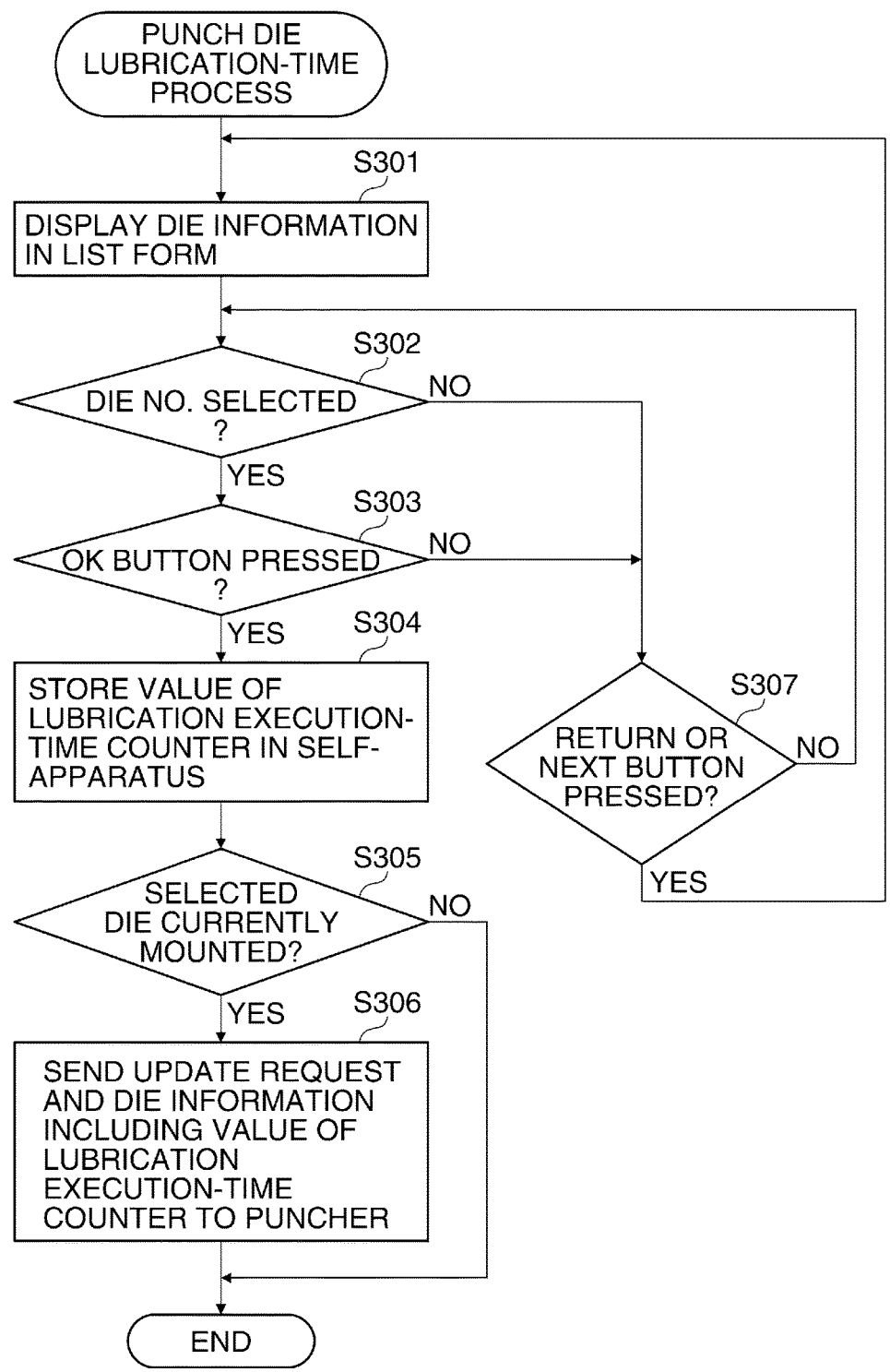
FIG. 15 is a flowchart of a punch die lubrication-time process.

FIG. 15 is a flowchart of a punch die lubrication-time process performed by the image forming apparatus 10. This process is started e.g. when a lubrication start button, not shown, is pressed on the console unit 600, and is performed by the CPU 901. It is assumed that this process is performed when a removed punch die 283 is lubricated by a user. This process is performed for updating the value of a lubrication execution-time counter, referred to hereinafter, of die information held by at least the image forming apparatus 10, at the time of lubrication of a punch die. First, the die information will be described.

FIGS. 16A, 16B, and 16C are views each showing an example of die information displayed in the form of a list, under the name of a punch die counter 160. FIG. 17A is a conceptual view of die information stored in the die memory 282. FIGS. 17B, 17D, 17F, and 17H are views each showing an example of the die information stored in the die memory 282. FIGS. 17C, 17E, 17G, and 17I are views each showing an example of die information held in the RAM 903 of the image forming apparatus 10.

As shown in e.g. FIG. 17A, die information includes a die ID, a die number (shown as DIE NO.), a total counter, and a lubrication execution-time counter. The die ID is e.g. a number indicative of a type of each of the punch dies 283. The type of a punch die is a 4-round-hole type, a 30-round-hole type, or a 30-square-hole type, for example. The die number is e.g. a serial number assigned to each of the punch dies 283. Each of the die ID and the die number as a management number is number information (identification information) associated with each of the punch dies 283. Each of the punch dies 283 is uniquely identified using either of these numbers. However, in a case where a plurality of punch dies 283 of the same type are set ready for use, it is required to use the die number to distinguish between the punch dies 283. A value of the total counter represents the total number of times of use (i.e. the total number of times of punching) counted from the first use of each punch die 283, and in a case where the punch die 283 is used in another puncher 200, the number of times of the use therein is also included in the total counter number of the punch die 283. A value of the lubrication execution-time counter represents the number of times of use counted from the time of the start of use of each punch die 283 up to the time of the latest (immediately preceding) lubrication thereof. In other words, the value of the lubrication execution-time counter is information indicative of a value associated with the latest lubrication time, and this information is an example of "maintenance information".

In the die information displayed as the punch die counter 160 (see e.g. 16A), a value of the lubrication counter is information indicative of the number of times of use of the punch die 283 counted from the time of the latest lubrication thereof. The value of the lubrication counter corresponds to a value calculated by "the value of the total counter−the value of the lubrication execution-time counter". The die information displayed as the punch die counter 160 is based on information sent in a format shown in FIG. 17A from the puncher 200 to the image forming apparatus 10 when the punch die 283 is mounted or when the puncher 200 is powered on. This information is stored in the RAM 903. Note that the die information may be stored in a storage device, such as a hard disk, not shown, provided in the image forming apparatus 10. Information on a punch die having been ever mounted in the puncher 200 even once is stored in the RAM 903 or in the above-mentioned storage device.

Referring to FIG. 15, first, in a step S301, the CPU 901 displays die information on the display section 620 in the form of a list. In this list, die information of all punch dies 283 having been mounted in the puncher 200 before is displayed (see FIG. 16A). Next, the CPU 901 determines whether or not a punch die 283 that requires update of the maintenance information has been selected, by determining whether any die number has been selected (step S302). Note that the punch die 283 may be selected by selection of a die ID in place of the die number.

If it is determined that any die number has been selected, the CPU 901 proceeds to a step S303. In the step S303, the selected die number and the value of a lubrication counter associated therewith of the punch die counter 160 are displayed in reverse video (see FIG. 16A), and at the same time, it is determined whether or not an OK button 161 has been pressed. If the OK button 161 has been pressed, the CPU 901 updates the value of the lubrication execution-time counter of the corresponding die information held in the RAM 903 (step S304). More specifically, the value of the total counter of the die information is copied to the lubrication execution-time counter of the same as shown in FIG. 17C. Further, in parallel with this operation, the value of the lubrication counter in the punch die counter 160 is updated to 0 which is calculated by "the value of the total counter− the value of the lubrication execution-time counter", as shown in FIG. 16B. In other words, an operation for designating a punch die and pressing the OK button 161 corresponds to input of information indicative of execution of lubrication of the punch die to the image forming apparatus 10 by the user. Further, this operation corresponds to an instruction by the user for the update of the lubrication execution-time counter.

Then, the CPU 901 determines whether or not the punch die 283 lubricated this time, i.e. the punch die 283 selected as a target for update of the maintenance information is currently mounted (step S305). If it is determined that the selected punch die 283 is currently mounted, the CPU 901 sends die information including the update request and the updated value of the lubrication execution-time counter to the puncher 200 (step S306). This transmission of the die information serves as a die information update request to the puncher 200. In the puncher 200, die information stored in the die memory 282 is rewritten by the CPU 972 based on the received die information (steps S207 to S209 in FIG. 14).

This causes the value of the lubrication execution-time counter of the die information, shown in FIG. 17B, stored in the die memory 282 to be updated, whereby the die information shifts to die information shown in FIG. 17D. In parallel with this, the die information, shown in FIG. 17C, held in the RAM 903 shifts to die information shown in FIG. 17E without any change in the contents.

On the other hand, if it is determined in the step S305 that the selected punch die 283 is not currently mounted, the CPU 901 terminates the FIG. 15 punch die lubrication-time process without transmitting the die information. This corresponds to a case where a mounted punch die 283 is different from the selected punch die 283 or a case where no punch die 283 is currently mounted. In this case, the die information stored in the die memory 282 remains the same as the information shown in FIG. 17B.

If it is determined in the step S302 that no die number has been selected or if it is determined in the step S303 that the OK button 161 has not been pressed, the CPU 901 determines whether or not a return button 162 or a next button 163 has been pressed (step S307). If it is determined that the return button or the next button has been pressed, the CPU 901 returns to the step S301, whereas neither of the buttons has been pressed, the CPU 901 returns to the step S302.

Note that, in the step S306, without transmitting the update request, transmission of the die information including the value of the lubrication execution-time counter to the puncher 200 may be caused to serve as an alternative way of transmission of the update request. In this case, in the step S207 of the punch die communication process in FIG. 14, the receipt of the die information corresponds to the receipt of the update request.

Figure 18:
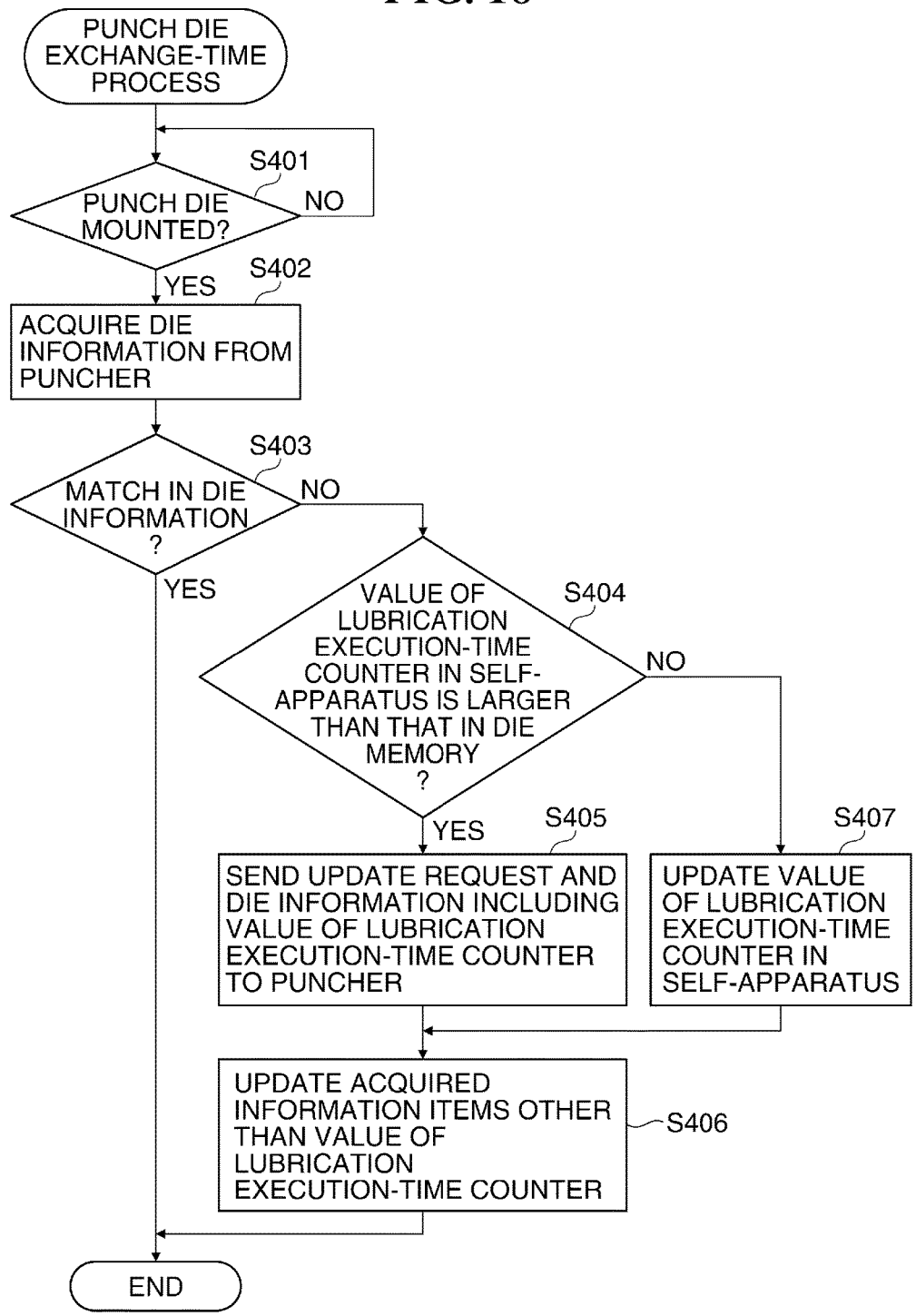
FIG. 18 is a flowchart of a punch die exchange-time process.

Next, a description will be given, with reference to FIG. 18, of processing performed in the image forming apparatus 10 when a punch die 283 is exchanged with another in the puncher 200. FIG. 18 is a flowchart of a punch die exchange-time process. This process is started when the image forming apparatus 10 is powered on, and is repeatedly performed by the CPU 901 at predetermined time intervals.

First, the CPU 901 waits until a punch die 283 is mounted in the puncher 200 anew (step S401). The determination as to whether or not a punch die 283 has been mounted anew is performed based on the information sent from the CPU 972 in the step S203 in FIG. 14. When a punch die 283 is mounted anew, the CPU 901 acquires die information formatted as shown in FIG. 17A from the puncher 200 (step S402). In this step, the CPU 901 issues a die information transmission request and receives die information sent by the CPU 972 of the puncher 200 in the steps S205 and S206 in FIG. 14 in response to the request to thereby acquire the die information.

Then, the CPU 901 determines whether or not the acquired die information matches die information stored in the RAM 903 and including the same die number (step S403). If it is determined that the acquired die information matches the die information held in the RAM 903, which means that the two pieces of die information are in an up-to-date state, the CPU 901 terminates the FIG. 18 process. In this state, for example, the die information stored in the die memory 282 is information shown in FIG. 17D and the die information held in the RAM 903 is information shown in FIG. 17E, the two pieces of die information matching each other. On the other hand, if the acquired die information does not match the die information held in the RAM 903, which means that one of the two is not in an up-to-date state, the CPU 901 proceeds to the step S404 and subsequent steps.

In the step S404, the CPU 901 performs comparison between the value of the lubrication execution-time counter in the acquired die information stored in the die memory and the value of the lubrication execution-time counter of the die information held in the self-apparatus (i.e. the RAM 903) to thereby determine whether or not the value of the lubrication execution-time counter in the self-apparatus is larger. The relationship in the magnitude of the value of the lubrication execution-time counter between the two pieces of die information is a factor determining the newness of information which indicates the latest lubrication time, and information indicative of the larger value is the newer.

If it is determined that the value of the lubrication execution-time counter in the self-apparatus is larger than that of the lubrication execution-time counter of the die information in the die-memory, the CPU 901 proceeds to a step S405. It is considered that this situation corresponds to a case where the punch die 283 selected as a target for update of the maintenance information is mounted in the puncher 200 for the first time after execution of the lubrication. In this case, since the value of the lubrication execution-time counter in the self-apparatus is the latest one, the CPU 901 sends the die information update request and die information including the value of the lubrication execution-time counter in the self-apparatus to the puncher 200 in the step S405. In the puncher 200, the die information in the die memory 282 is rewritten by the CPU 972 based on the received die information (steps S207 to S209 in FIG. 14).

This causes the value of the lubrication execution-time counter of the die information, shown in FIG. 17B, stored in the die memory 282 to be updated, so that the die information shifts to the die information shown in FIG. 17D. Alternatively, the value of the lubrication execution-time counter of the die information shown in FIG. 17F is updated, so that the die information shifts to the die information shown in FIG. 17H.

On the other hand, if it is determined in the step S404 that the value of the lubrication execution-time counter of the die information in the die memory 282 is not smaller than that of the lubrication execution-time counter in the self-apparatus, the CPU 901 proceeds to a step S407. It is considered that this situation corresponds to a case where the punch die used in another puncher is mounted in the puncher 200 again. In this case, since the information stored in the RAM 903 cannot be newer than the information acquired from the die memory, the CPU 901 updates the value of the lubrication execution-time counter of the die information held in the RAM 903 of the self-apparatus to the value of the lubrication execution-time counter of the die information stored in the die memory 282.

After execution of the step S405 or S407, the CPU 901 proceeds to a step S406, wherein each of the items other than the lubrication execution-time counter of the die information held in the RAM 903 is updated to the latest value. For example, the value of the total counter of the die information shown in FIG. 17G is updated, so that the die information shifts to die information as shown in FIG. 17I. In this case, a punch die counter 160 shown in FIG. 16C is displayed on the display section 620.

As is apparent from the processes shown in FIGS. 14, 15, and 18, when a mounted punch die 283 is selected as a target for update of the maintenance information, the die information update request is sent to the puncher 200 (step S306 in FIG. 15). Therefore, in the puncher 200, the update of the value of the lubrication execution-time counter of the die information stored in the punch die 283 in the mounted state is promptly reflected by update work (steps S207 to S209 in FIG. 14). On the other hand, when a punch die 283 that is not currently mounted is selected and also the value of the lubrication execution-time counter stored in the self-apparatus is the latest one, the die information update request and the die information are sent to the puncher 200 when the punch die 283 is mounted next time (step S405 in FIG. 18). Therefore, even when the user designates a punch die 283 that is not currently mounted, only if update work for updating the maintenance information stored in the image forming apparatus 10 is performed by the user, the value of the lubrication execution-time counter stored in the punch die 283 is automatically updated upon mounting of the punch die 283.

According to the present embodiment, the puncher 200 receives from the image forming apparatus 10 an update request for the update of the value of a lubrication execution-time counter (maintenance information) stored in the designated die memory 282. When the update request designating a punch die 283 is received, in a case where the punch die 283 is currently mounted, the puncher 200 updates the value of the lubrication execution-time counter stored in the die memory 282 based on the update request. In a case where the punch die 283 is not currently mounted, the puncher 200 updates the value of the lubrication execution-time counter in the die memory 282 of the punch die 283 upon mounting of the punch die 283. Thus, even when the user designates a punch die 283 that is not currently mounted, only if the update work is performed by the user, it is possible to cause the value of the lubrication execution-time counter in the punch die 283 to be updated upon mounting of the punch die 283. Therefore, the update work for update of the maintenance information can be performed irrespective of whether or not the punch die 283 is currently mounted, which makes it possible to eliminate the need for performing troublesome work at a lubrication time to thereby reduce work time at the time of lubrication.

Further, in a case where the value of the lubrication execution-time counter stored in the die memory 282 of the mounted punch die 283 is larger than the value of the lubrication execution-time counter stored in the RAM 903, the value of the lubrication execution-time counter stored in the RAM 903 is updated to the value of the lubrication execution-time counter stored in the die memory 282. This makes it possible, for example, even when a punch die 283 is mounted in the puncher 200 again after having been used in another apparatus, the maintenance information in the image forming apparatus 10 can be updated to the latest information.

Punch die designation in an update request is performed by designating a die ID or a die number as a management number for identifying an associated one of the punch dies, so that the maintenance information on the punch dies 283 can be managed on a punch die-by-punch die basis.

Next, a second embodiment of the present invention will be described. In the first embodiment, in a case where a designated punch die 283 is not currently mounted, the puncher 200 receives an update request and die information upon mounting of the designated punch die 283 (step S405 or S208). In contrast, in the second embodiment, also in a case where a designated punch die 283 is not currently mounted, the puncher 200 receives and stores an update request and die information of the punch die 283, and when the designated punch die 283 is mounted, updates the maintenance information.

Therefore, a description will be given of the second embodiment using FIG. 20A in place of FIG. 9, FIGS. 20B, 20C, and 20D in place of FIGS. 16A to 16C, FIGS. 21A to 21F in place of FIGS. 17A to 17I, and FIGS. 19 and 22 in place of FIGS. 14, 15, and 18. Description of the same components and elements in the system configuration and operation as those in the first embodiment is omitted.

Figure 19:
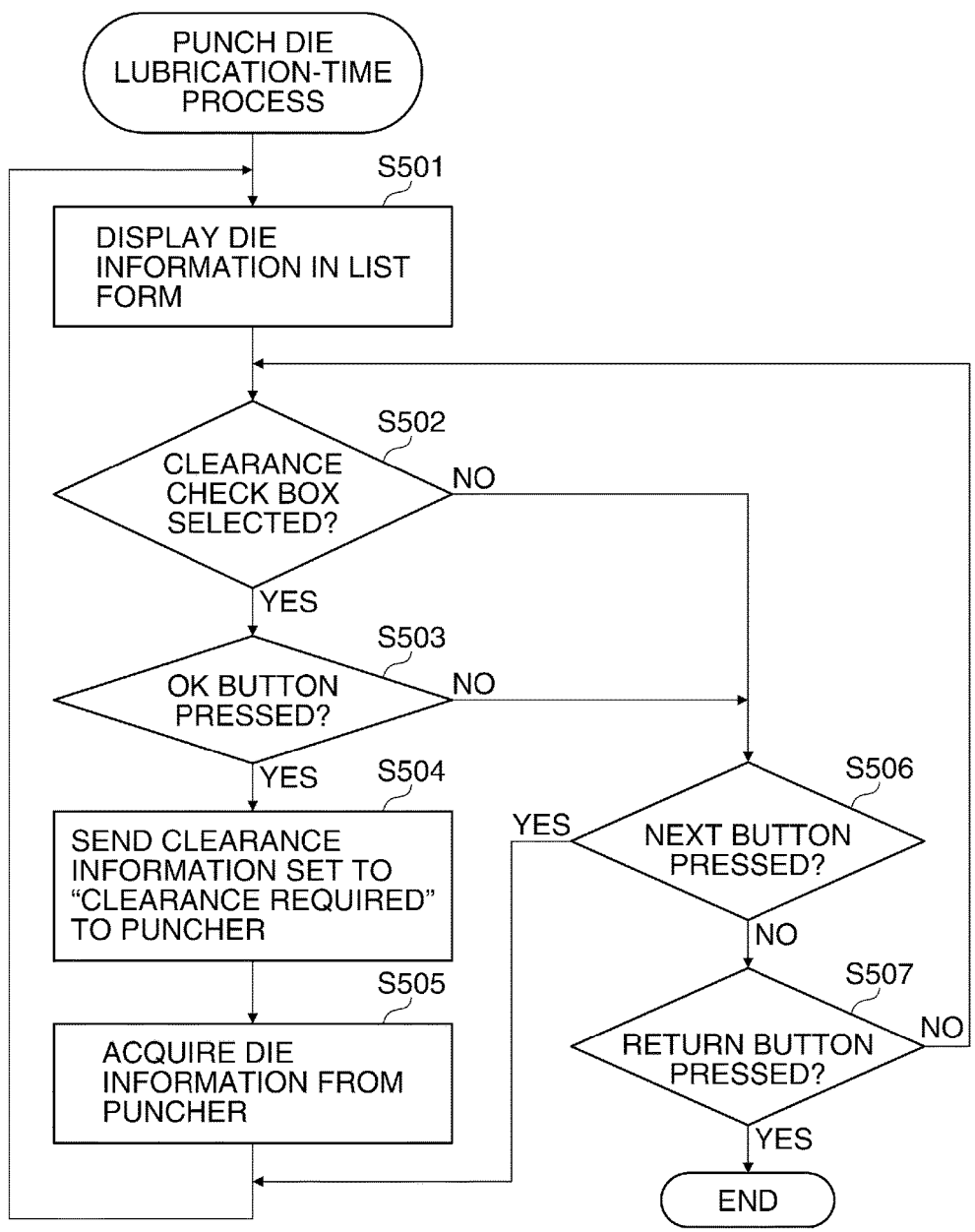
FIG. 19 is a flowchart of a punch die lubrication-time process.

FIG. 19 is a flowchart of a punch die lubrication-time process performed by the image forming apparatus 10. First, a description will be given of die information in the present embodiment.

FIG. 20A is a view showing an example of the finish selection screen 622 displayed on the display section 620. FIGS. 20B, 20C, and 20D are views each showing an example of die information displayed as punch die lubrication information 630 in the form of a list on the display section 620 of the console unit 600. FIG. 21A is a conceptual view of die information stored in the die memory 282, and FIGS. 21C and 21E are views each showing an example of the die information. FIG. 21B is a conceptual view of die information held in the RAM 974 of the puncher 200, and FIGS. 21D and 21F are views each showing an example of the die information.

As shown in FIG. 21A, the die information stored in the die memory 282 includes a die ID, a die number (shown as DIE NO.), a total counter, and a lubrication counter. The die ID, the die number, and the total counter are the same as those described with reference to FIG. 17A. The lubrication counter is the same as that described with reference e.g. to FIG. 16A. However, in the present embodiment, the value of the lubrication counter corresponds to "maintenance information". Further, as shown in FIG. 21B, the die information held in the RAM 974 of the puncher 200 includes lubrication counter clearance information in addition to the die information stored in the die memory 282. This clearance information includes "clearance required" and "clearance not required". The "clearance required" of the clearance information indicates that lubrication should be performed and also the lubrication counter should be initialized to 0. A square area in the column of "lubrication execution (clearance)" of the punch die lubrication information 630 shown in FIGS. 20B, 20C, and 20D is a clearance check box 631 for entry of whether execution of lubrication is required or not required.

Note that at a time point at which a brand-new punch die 283 is mounted in the puncher 200 for the first time, it is assumed that the value of the lubrication counter is set to an initial value of 0. Further, the die information stored in the RAM 974 of the puncher 200 is sent to the image forming apparatus 10 and is also stored in the RAM 903 of the same, as die information formatted as shown in FIG. 21B. The lubrication counter clearance information is initially set to "clearance not required".

In a case where it is required to lubricate a punch die 283 currently mounted in the puncher 200, a message prompting execution of lubrication is displayed on the finish selection screen 622 shown in FIG. 20A. Further, when a punch key 623 is selected, an "execute immediately" button 627 is displayed. The message prompting execution of lubrication is displayed e.g. when the value of the lubrication counter of the die information held in the RAM 974 is not smaller than a predetermined value.

The FIG. 19 process is started when the "execute immediately" button 627 is pressed, and is executed by the CPU 901. First, in a step S501 in FIG. 19, the CPU 901 displays the punch die lubrication information in the form of a list on the display section 620. For example, as shown in FIG. 20B, information on all punch dies 283 having been mounted in the puncher 200 before is displayed in the form of a list, and the die number of a currently mounted punch die 283 is displayed in reverse video. All pieces of the information were sent from the puncher 200 to the image forming apparatus 10 when the punch die 283 was mounted or when the puncher 200 was powered on, but after execution of a step S505, referred to hereinafter, the latest information acquired in the step S505 is displayed.

Then, the CPU 901 determines, based on the displayed list (FIG. 20B) of the punch die lubrication information, whether or not a clearance check box 631 has been selected (step S502). If it is determined that a clearance check box 631 has been selected, the CPU 901 displays the clearance check box 631 in reverse video as illustrated in FIG. 20C and also determines whether or not an OK button 632 has been pressed (step S503). If it is determined that the OK button 632 has been pressed, the CPU 901 sends clearance information set to "clearance required" to the puncher 200 in a state associated with a die number corresponding to the selected clearance check box 631 (step S504). This causes a die information update request of the designated punch die 283 to be sent to the puncher 200.

Then, the CPU 901 acquires the latest die information from the puncher 200 (step S505), and returns to the step S501. At this time, the lubrication counter corresponding to the die number included in the received die information is initialized (cleared) to 0, and the message indicating that lubrication is required (see FIG. 20A) is caused to disappear from the finish selection screen 622.

On the other hand, if it is determined in the step S502 that no clearance check box 631 has been selected or if it is determined in the step S503 that the OK button has not been pressed, the CPU 901 proceeds to a step S506, wherein the CPU 901 determines whether or not a "next" button 633 has been pressed on the finish selection screen 622. If the "next" button 633 has been pressed, the CPU 901 returns to the step S501. On the other hand, if the "next" button 633 has not been pressed, the CPU 901 determines whether or not a "return" button 634 has been pressed (step S507). If the "return" button 634 has not been pressed, the CPU 901 returns to the step S502, whereas if the "return" button 634 has been pressed, the CPU 901 terminates the FIG. 19 process.

Incidentally, in the FIG. 19 process, as to punch dies 283 other than the currently mounted punch die 283, it is possible to check associated clearance check boxes 631 and clear the values of associated lubrication counters, respectively. For example, clearance processing can also be performed for the other punch dies 283 than the punch die 283 assigned the die number "CCCCC" in FIG. 20B.

Figure 22:
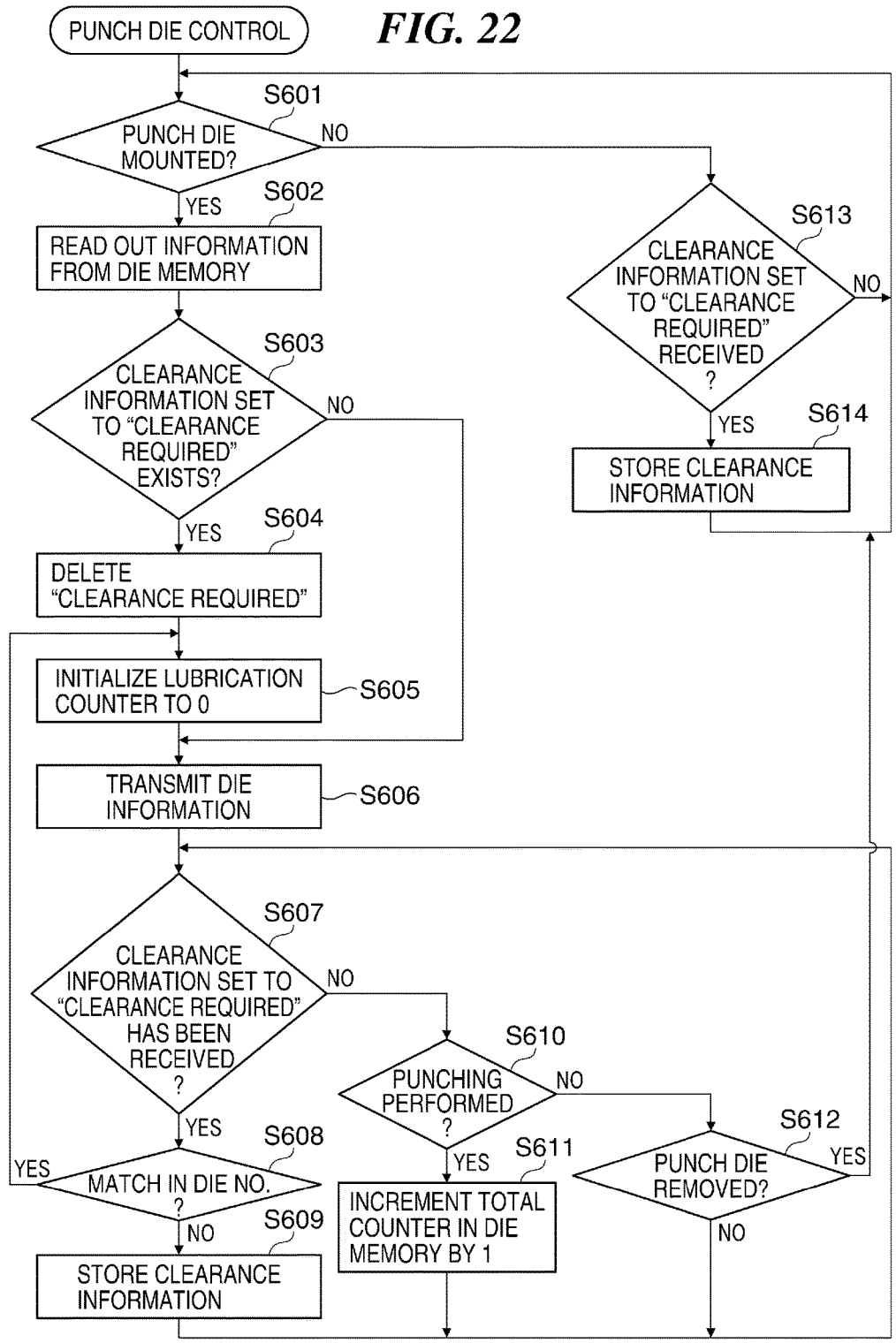
FIG. 22 is a flowchart of a punch die control process.

FIG. 22 is a flowchart of a punch die control process. This process is performed by the CPU 972 and is started when the puncher 200 is powered on.

First, the CPU 972 determines whether or not there is a punch die 283 currently mounted in the punch unit 280 (step S601). This determination is performed based on whether or not communication with a die memory 282 is possible, and if the communication is possible, it is determined that there is a punch die 283 currently mounted. Note that a sensor for detecting mounting of a punch die 283 may be provided in the puncher 200 so as to determine, based on a result of detection by the sensor, whether or not there is a punch die 283 currently mounted.

If it is determined that there is no punch die 283 currently mounted, the CPU 972 determines whether or not lubrication counter clearance information set to "clearance required" has been received (step S613). This information is received in the step S504 in FIG. 19. If it is determined that the lubrication counter clearance information set to "clearance required" has been received, the CPU 972 proceeds to a step S614, wherein the CPU 972 sets lubrication counter clearance information included in die information held in the RAM 974 and including a die number associated with the received clearance information to "clearance required" and stores the same. In this case, the die information is set as shown in FIG. 21D, for example. This makes it possible to receive and store the update request designating a punch die 283 that is not currently mounted, in advance, and clear the lubrication counter when the designated punch die is mounted. Thereafter, the CPU 972 returns to the step S601. On the other hand, if no lubrication counter clearance information set to "clearance required" has been received, the CPU 972 directly returns to the step S601. In this case, the contents of the die information are held unchanged as shown in FIG. 21F.

If it is determined in the step S601 that there is a punch die 283 currently mounted, the CPU 972 reads out die information formatted as shown in FIG. 21A from the die memory 282 of the currently mounted punch die 283 (step S602). The die information read out has its contents set as shown in FIG. 21C, for example.

Next, the CPU 972 determines whether or not the die information held in the RAM 974 includes lubrication counter clearance information set to "clearance required" (step S603). If it is determined that the die information includes lubrication counter clearance information set to "clearance required", the CPU 972 deletes the information "clearance required" from the clearance information and sets the clearance information to "clearance not required" (step S604). Further, the CPU 972 initializes the lubrication counter in each of the die information held in the RAM 974 and the die information stored in the die memory 282 to 0 (step S605). This updates the lubrication counter which is the maintenance information. The die information in the die memory 282 and the die information in the RAM 974 each have its contents set as shown in FIG. 21E and FIG. 21F, respectively, for example. Thereafter, the CPU 972 proceeds to a step S606.

On the other hand, if it is determined in the step S603 that the die information includes no lubrication counter clearance information set to "clearance required", the CPU 972 directly proceeds to the step S606. In the step S606, the die information held in the RAM 974 is sent to the CPU circuit section 900. This enables the image forming apparatus 10 to acquire the latest die information from the puncher 200 (step S505 in FIG. 19).

Then, the CPU 972 determines whether or not lubrication counter clearance information set to "clearance required" has been received (step S607). This information is received in the step S504 in FIG. 19. Note that a punch die 283 is in a mounted state at a time point when the determination is performed in the step S607. If it is determined that lubrication counter clearance information set to "clearance required" has been received, the CPU 972 determines whether or not a die number associated with the received clearance information matches the die number of the currently mounted punch die 283 (step S608). If it is determined that the two die numbers match each other, the received clearance information is an update request designating the currently mounted punch die 283. Therefore, the CPU 972 returns to the step S605, wherein the lubrication counter update processing is executed.

On the other hand, if the two die numbers do not match each other, the received clearance information is an update request designating a punch die 283 different from the currently mounted punch die 283. Therefore, similarly to the step S614, the CPU 972 sets lubrication counter clearance information included in die information held in the RAM 974 and including a die number associated with the received clearance information to "clearance required" and stores the same (step S609). This makes it possible to receive and store the update request designating the punch die 283 that is not currently mounted. Thereafter, the CPU 972 returns to the step S607.

If it is determined in the step S607 that no lubrication counter clearance information set to "clearance required" has been received, the CPU 972 determines whether or not punching has been performed (step S610). If punching has been performed, the CPU 972 updates the value of the total counter of the die information stored in the die memory 282 of the currently mounted punch die 283 by incrementing the same by 1 (step S611), and then returns to the step S607. On the other hand, if punching has not been performed, the CPU 972 determines whether or not the punch die 283 has been removed (step S612). If it is determined that the punch die 283 has not been removed, the CPU 972 returns to the step S607, whereas if it is determined that the punch die 283 has been removed, the CPU 972 returns to the step S601.

According to the present embodiment, when an update request designating a currently mounted punch die 283 is received, the puncher 200 updates the value of the lubrication counter in the die memory 282 of the punch die 283 based on the update request. In a state where the designated punch die 283 is not currently mounted, the puncher 200 stores the received update request. Then, when the punch die 283 designated by the update request is mounted, the puncher 200 updates the value of the lubrication counter in the die memory 282 of the punch die 283 based on the stored update request. This makes it possible to provide the same advantageous effect as provided by the first embodiment in that update work for updating maintenance information can be performed irrespective of whether or not a punch die 283 is currently mounted.

Note that although the value (count) of the lubrication execution-time counter and the value (count) of the lubrication counter are adopted as maintenance information in the respective first and second embodiments, this is not limitative, but it is possible to adopt another information item related to the lubrication time in each punch die 283, for example.

Further, although the puncher 200 is described as the punching apparatus to which the invention is applied, by way of example, it is possible to regard the whole or part of an image forming system including the puncher 200, as a punching apparatus, and apply the invention to the punching apparatus. Alternatively, it is possible to regard a puncher 200 provided with an image forming function as a punching apparatus, and apply the invention to the punching apparatus. Therefore, the invention can be applied to any apparatus or system that has a punching function as an essential function. For example, the invention may be applied to a so-called image forming apparatus insofar as the apparatus is equipped with a punching function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126702 filed Jun. 24, 2015 which is hereby incorporated by reference herein in its entirety.

What is claimed is:
1. A punching apparatus comprising:
   a puncher configured to perform a punching process on a sheet using an exchangeable punch die provided with a first memory for storing maintenance information which is information concerning maintenance of the exchangeable punch die;
   a detector configured to detect mounting of an exchangeable punch die in said puncher;
   a second memory configured to store the maintenance information stored in the first memory of the exchangeable punch die;
   a receiver configured to receive an update request requesting update of the maintenance information stored in the first memory of a designated exchangeable punch die; and
   a controller configured to, in a case where an update request requesting update of the maintenance information stored in the first memory of the designated exchangeable punch die is received by said receiver, if mounting of the designated exchangeable punch die has been detected by said detector, update the maintenance information stored in the first memory of the designated exchangeable punch die, based on the update request, and if mounting of the designated exchangeable punch die has not been detected by said detector, store, in the second memory, first information indicating that the update of the maintenance information stored in the first memory of the designated exchangeable punch die is required, without updating the maintenance information stored in the first memory of the designated exchangeable punch die, wherein in a case where the mounting of the designated exchangeable punch die has been detected by said detector and the first information is stored in the second memory, the controller updates the maintenance information stored in the first memory of the designated exchangeable punch die without the update request being received again by the receiver.

2. The punching apparatus according to claim 1, wherein designation of an exchangeable punch die is performed by designating identification information for identifying each of exchangeable punch dies, and in each of first memories of the respective exchangeable punch dies, the maintenance information and the identification information are stored in a manner associated with each other.

3. The punching apparatus according to claim 2, wherein the identification information is number information associated with each of the exchangeable punch dies.

4. The punching apparatus according to claim 1, wherein the maintenance information is information concerning a time at which maintenance is performed for the designated exchangeable punch die.

5. The punching apparatus according to claim 1, wherein the maintenance information is information concerning the number of times the punching process has been performed using the designated exchangeable punch die from a time at which the maintenance is performed for the designated exchangeable punch die.

6. The punching apparatus according to claim 1, wherein the maintenance is to perform lubrication for the exchangeable punch die.

7. The punching apparatus according to claim 1, wherein the controller deletes the first information stored in the second memory when updating the maintenance information stored in the first memory of the designated exchangeable punch die.

8. The punching apparatus according to claim 1, wherein the controller updates the maintenance information stored in the first memory of the designated exchangeable punch die and the maintenance information stored in the second memory.

9. A punching system comprising:
a an image forming section configured to perform image formation on a sheet;
a puncher configured to perform a punching process on a sheet using an exchangeable punch die provided with a first memory for storing maintenance information which is information concerning maintenance of the exchangeable punch die;
a detector configured to detect mounting of an exchangeable punch die in said puncher;
a second memory configured to store the maintenance information stored in the first memory of the exchangeable punch die;
a console configured to input maintenance completion information indicating that maintenance of a designated exchangeable punch die is complete; and
a controller configured to, in a case where the maintenance completion information is input by said console, if mounting of the designated exchangeable punch die has been detected by said detector, update the maintenance information stored in the first memory of the designated exchangeable punch die, and if mounting of the designated exchangeable punch die has not been detected by said detector, store, in the second memory, first information indicating that the update of the maintenance information stored in the first memory of the designated exchangeable punch die is required, without updating the maintenance information stored in the first memory of the designated exchangeable punch die, wherein in a case where the mounting of the designated exchangeable punch die has been detected by said detector and the first information is stored in the second memory, the controller updates the maintenance information stored in the first memory of the designated exchangeable punch die without the update request being input again by the console.

10. The punching system according to claim 9, wherein the maintenance information is information concerning the number of times the punching process has been performed using the designated exchangeable punch die from a time at which the maintenance is performed for the designated exchangeable punch die.

11. The punching system according to claim 9, wherein the maintenance is to perform lubrication for the exchangeable punch die.

12. The punching system according to claim 9, wherein the controller deletes the first information stored in the second memory when updating the maintenance information stored in the first memory of the designated exchangeable punch die.

13. The punching system according to claim 9, wherein the controller updates the maintenance information stored in the first memory of the designated exchangeable punch die and the maintenance information stored in the second memory.

14. The punching system according to claim 9, wherein designation of an exchangeable punch die is performed by designating identification information for identifying each of exchangeable punch dies, and in each of first memories of the respective exchangeable punch dies, the maintenance information and the identification information are stored in a manner associated with each other.

15. The punching system according to claim 14, wherein the identification information is number information associated with each of the exchangeable punch dies.

16. The punching system according to claim 9, wherein the maintenance information is information concerning a time at which lubrication is performed for maintenance of each exchangeable punch die.

* * * * *